(12) United States Patent
Rudenick et al.

(10) Patent No.: US 9,360,648 B2
(45) Date of Patent: Jun. 7, 2016

(54) SYSTEMS AND METHODS FOR THE MANAGEMENT OF FIBER OPTIC CABLES

(75) Inventors: Paula Rudenick, Jordan, MN (US); Dennis Krampotich, Shakopee, MN (US); Matthew Holmberg, Le Center, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 572 days.

(21) Appl. No.: 13/607,274

(22) Filed: Sep. 7, 2012

(65) Prior Publication Data

US 2013/0148937 A1   Jun. 13, 2013

Related U.S. Application Data

(60) Provisional application No. 61/535,699, filed on Sep. 16, 2011, provisional application No. 61/535,677, filed on Sep. 16, 2011.

(51) Int. Cl.
*G02B 6/00*   (2006.01)
*G02B 6/44*   (2006.01)
*G02B 6/46*   (2006.01)

(52) U.S. Cl.
CPC .............. *G02B 6/4478* (2013.01); *G02B 6/44* (2013.01); *G02B 6/46* (2013.01); *G02B 6/4459* (2013.01)

(58) Field of Classification Search
CPC ... G02B 6/4471; G02B 6/4478; G02B 6/4459
USPC .................................................. 385/136, 137
See application file for complete search history.

(56) References Cited

U.S. PATENT DOCUMENTS

| 2,318,853 | A | 3/1941 | Hall |
| 3,061,253 | A | 1/1960 | Keaton |
| 3,802,654 | A | 4/1974 | Jenko et al. |
| 4,119,285 | A | 10/1978 | Bisping et al. |
| 4,470,179 | A | 9/1984 | Gollin et al. |

(Continued)

FOREIGN PATENT DOCUMENTS

| DE | 10 2007 009 233 A1 | 8/2008 |
| JP | 2010-88255 | 4/2010 |
| KR | 20-0445726 Y1 | 8/2009 |

OTHER PUBLICATIONS

International Search Report and Written Opinion for application No. PCT/US2010/031897 mailed Jun. 6, 2011.

(Continued)

*Primary Examiner* — Rhonda Peace
(74) *Attorney, Agent, or Firm* — Merchant & Gould P.C.

(57) ABSTRACT

The present disclosure relates to a fiber optic retention device to properly accommodate for cable management arrangements and schemes in telecommunication infrastructures that are massive in scale and/or require subsequent adaptation of the infrastructures. One embodiment includes a C-shaped opening with a door that snap mounts to the body with two snaps and pivot posts. One embodiment includes a C-shaped opening with a door that snap mounts to the body and is retained by a living hinge on an opposite end. One embodiment includes a C-shaped opening with flexible fingers that retain the cables within the opening. One embodiment includes a C-shaped opening with a door which moves parallel to a front opening. The door includes an angled surface to allow cables pressed onto the angled surface to move the door against a biasing member.

15 Claims, 18 Drawing Sheets

(56) References Cited

U.S. PATENT DOCUMENTS

| | | | |
|---|---|---|---|
| 4,561,153 A | 12/1985 | Matsui | |
| 4,805,479 A | 2/1989 | Brightwell | |
| 4,917,340 A | 4/1990 | Juemann et al. | |
| 5,005,266 A * | 4/1991 | Fister et al. | 24/601.5 |
| 5,210,914 A * | 5/1993 | Katsma | 24/588.1 |
| 5,529,268 A | 6/1996 | Wright | |
| 5,725,185 A | 3/1998 | Auclair | |
| 5,742,982 A | 4/1998 | Dodd et al. | |
| 5,887,487 A | 3/1999 | Bravo | |
| 5,961,081 A | 10/1999 | Rinderer | |
| 5,988,570 A | 11/1999 | Gretz | |
| 6,173,104 B1 | 1/2001 | Polidori | |
| 6,215,069 B1 * | 4/2001 | Martin et al. | 174/68.3 |
| 6,220,554 B1 | 4/2001 | Daoud | |
| 6,332,594 B2 | 12/2001 | Shelton et al. | |
| 6,443,402 B1 | 9/2002 | Ferrill et al. | |
| 6,466,727 B1 * | 10/2002 | Leeb | 385/137 |
| 6,517,032 B1 | 2/2003 | Gretz | |
| 6,539,161 B2 * | 3/2003 | Holman et al. | 385/136 |
| 6,594,436 B2 * | 7/2003 | Sun et al. | 385/137 |
| 6,614,981 B2 * | 9/2003 | Zdinak et al. | 385/136 |
| 6,658,193 B1 * | 12/2003 | Ati | G02B 6/4471 385/134 |
| 6,665,484 B2 * | 12/2003 | Douglas et al. | 385/136 |
| 6,677,520 B1 | 1/2004 | Kim et al. | |
| 6,768,858 B2 | 7/2004 | Tinucci et al. | |
| 6,771,871 B2 * | 8/2004 | Krampotich et al. | 385/134 |
| 6,850,687 B2 * | 2/2005 | Lavoie | 385/137 |
| 6,892,020 B2 * | 5/2005 | Douglas et al. | 385/136 |
| 6,944,383 B1 | 9/2005 | Herzog et al. | |
| 6,947,654 B2 * | 9/2005 | Krampotich et al. | 385/134 |
| 7,077,363 B2 | 7/2006 | Rivera | |
| 7,079,744 B2 | 7/2006 | Douglas et al. | |
| 7,097,473 B2 * | 8/2006 | Krampotich et al. | 439/134 |
| 7,107,653 B2 | 9/2006 | Thompson | |
| 7,150,439 B2 | 12/2006 | Konold | |
| 7,201,352 B2 | 4/2007 | Kawai | |
| 7,210,658 B2 | 5/2007 | Carrera | |
| 7,228,048 B1 * | 6/2007 | Dunfee et al. | 385/136 |
| 7,267,307 B2 | 9/2007 | Bauer | |
| 7,346,252 B2 * | 3/2008 | Krampotich et al. | 385/134 |
| 7,373,071 B2 | 5/2008 | Douglas et al. | |
| 7,397,996 B2 | 7/2008 | Herzog et al. | |
| 7,527,226 B2 * | 5/2009 | Kusuda et al. | 248/71 |
| 7,837,156 B1 | 11/2010 | Handler | |
| 7,909,624 B2 * | 3/2011 | Iida | 439/131 |
| 7,933,484 B2 | 4/2011 | Hetzer et al. | |
| 8,074,945 B2 | 12/2011 | Schoenau et al. | |
| 8,275,230 B2 * | 9/2012 | Womack | 385/137 |
| 8,485,479 B2 | 7/2013 | Chiu et al. | |
| 8,805,153 B2 * | 8/2014 | Rudenick et al. | 385/137 |
| 8,882,051 B2 * | 11/2014 | Bleus et al. | 248/67.7 |
| 9,212,765 B1 * | 12/2015 | Chia | F16L 3/127 |
| 2002/0131751 A1 * | 9/2002 | Zdinak et al. | 385/136 |
| 2002/0181921 A1 | 12/2002 | Daoud et al. | |
| 2005/0152536 A1 | 7/2005 | Caveney | |
| 2006/0204198 A1 * | 9/2006 | Michiels | 385/135 |
| 2007/0017266 A1 | 1/2007 | Huang | |
| 2008/0093510 A1 | 4/2008 | Oh et al. | |
| 2008/0185183 A1 | 8/2008 | Chen | |
| 2008/0239681 A1 * | 10/2008 | Iida | 361/752 |
| 2009/0266945 A1 | 10/2009 | Dietrich et al. | |
| 2010/0012792 A1 | 1/2010 | Gollin et al. | |
| 2010/0209068 A1 * | 8/2010 | Womack | 385/137 |
| 2010/0272410 A1 * | 10/2010 | Krampotich et al. | 385/136 |
| 2011/0100772 A1 * | 5/2011 | Narayanan et al. | 188/2 D |
| 2012/0097804 A1 | 4/2012 | Liu | |
| 2013/0140410 A1 | 6/2013 | Lee et al. | |
| 2013/0148937 A1 * | 6/2013 | Rudenick et al. | 385/136 |
| 2014/0334793 A1 | 11/2014 | Rudenick et al. | |

OTHER PUBLICATIONS

International Search Report and Written Opinion for PCT/US2012/054148 mailed Feb. 27, 2013.

* cited by examiner

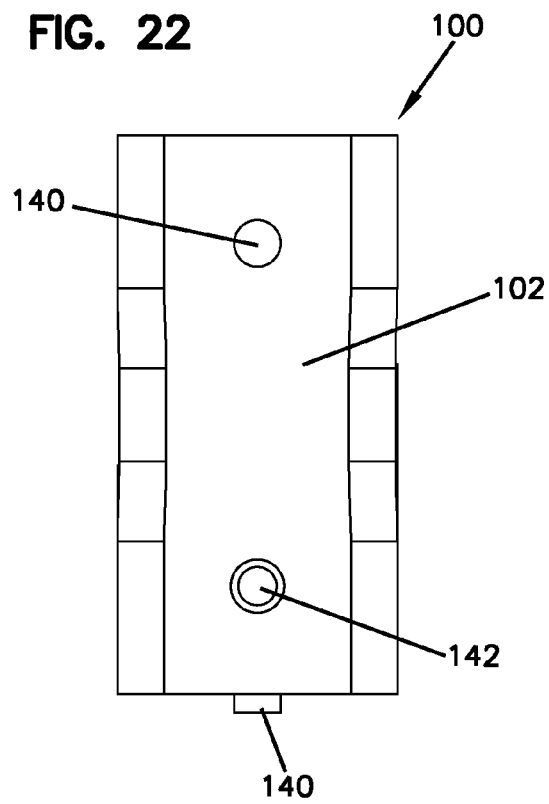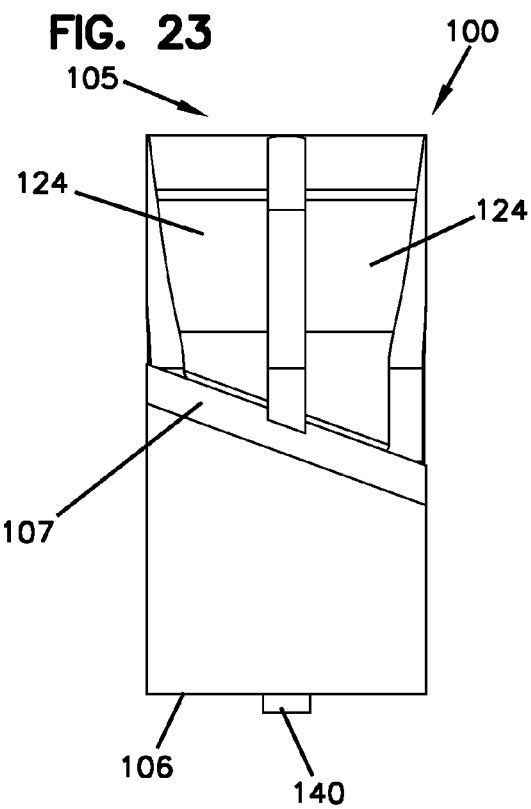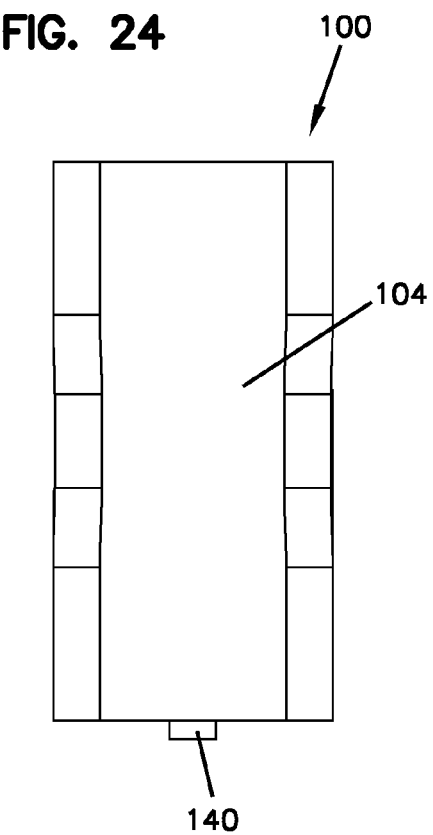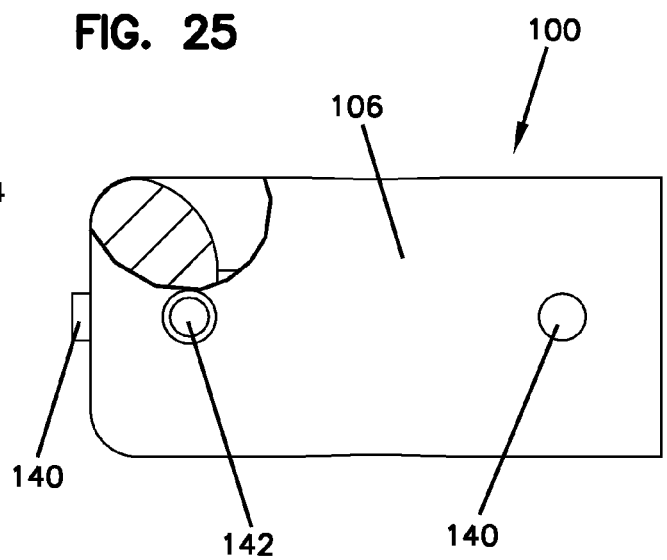

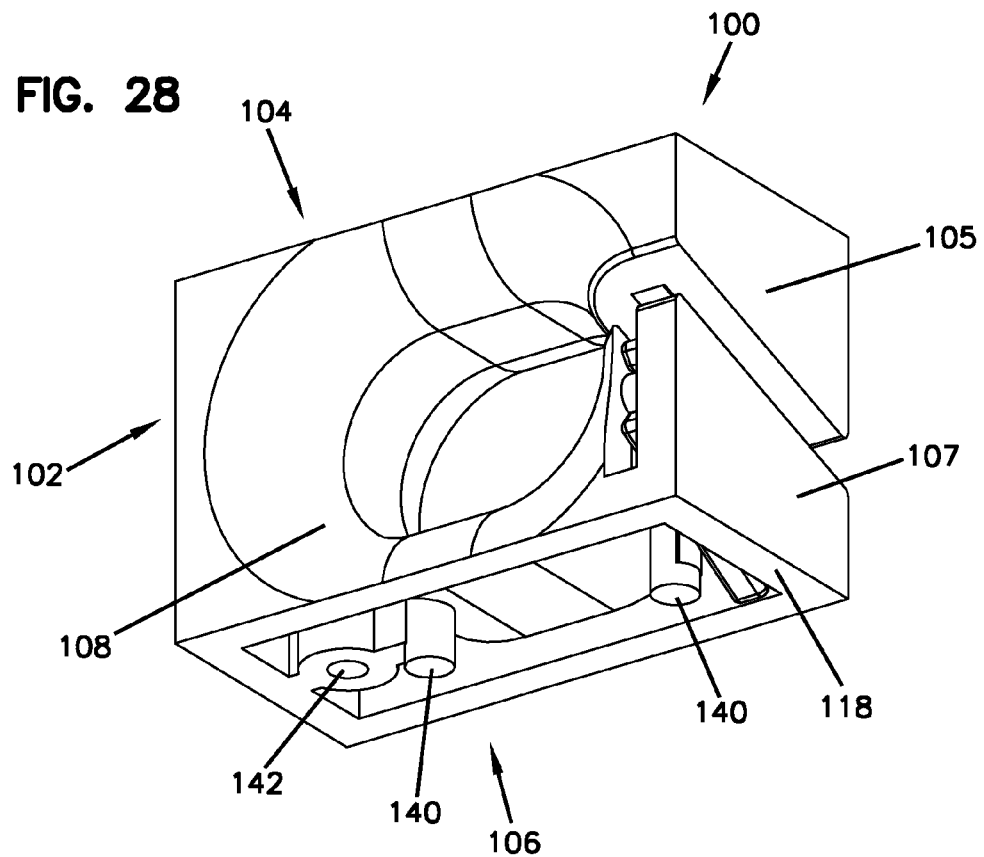
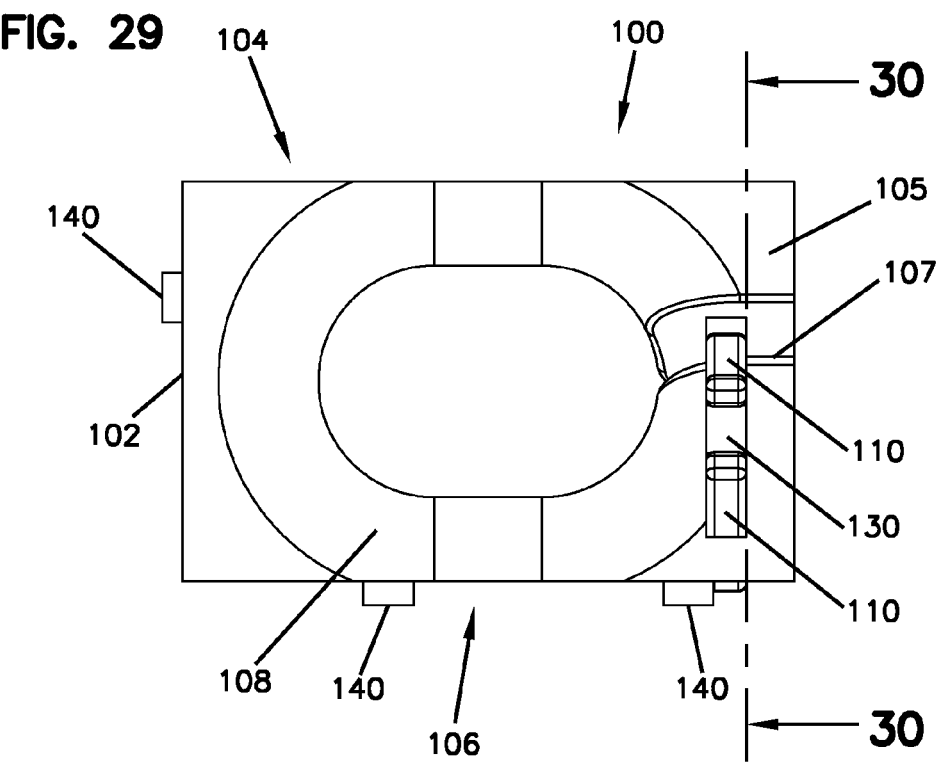

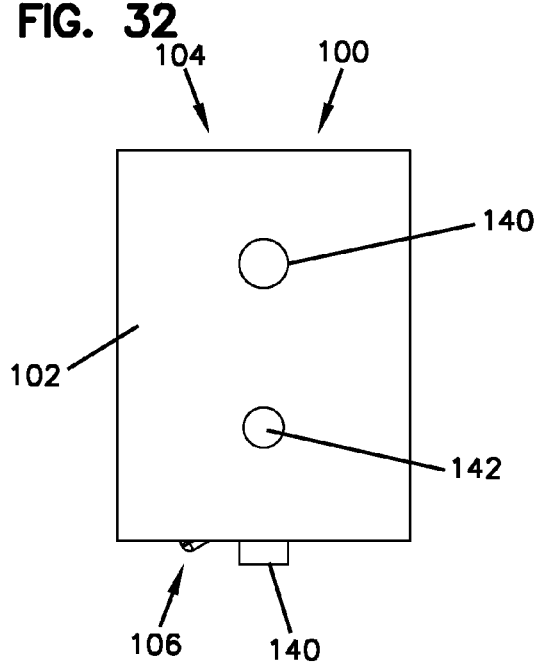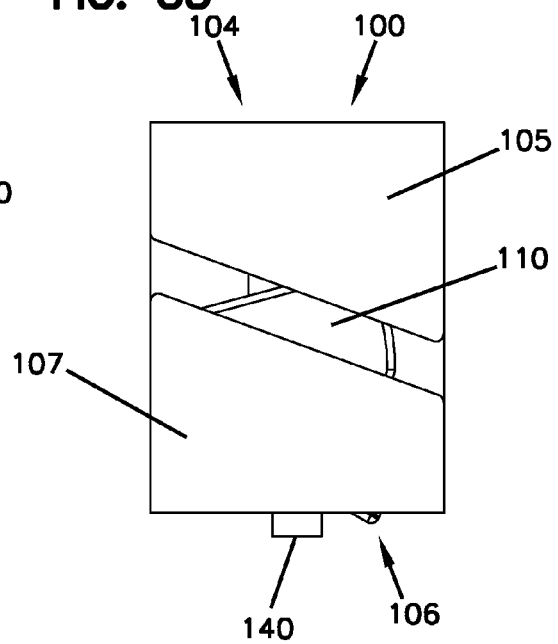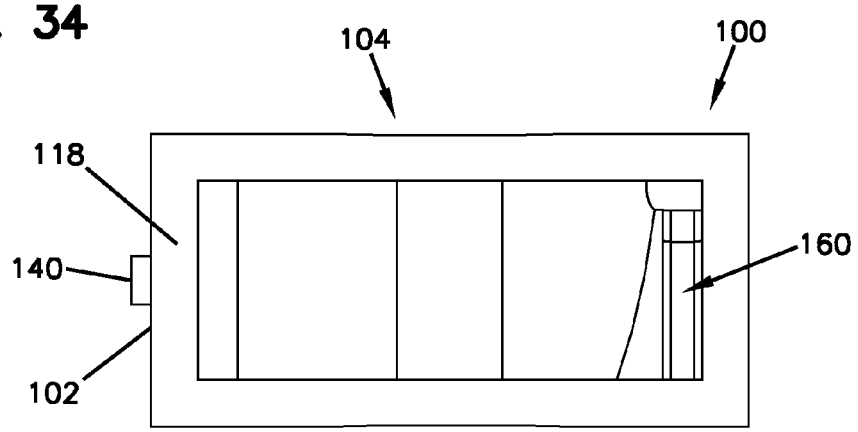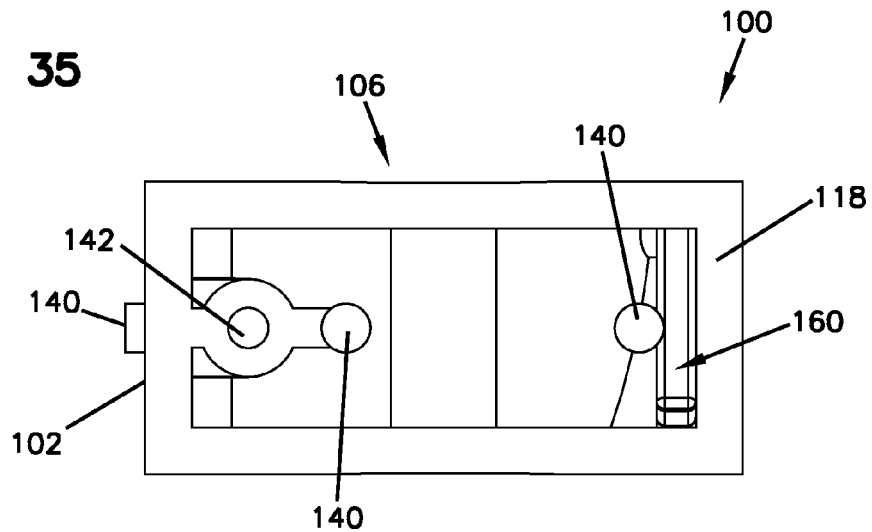

SYSTEMS AND METHODS FOR THE MANAGEMENT OF FIBER OPTIC CABLES

CROSS REFERENCE TO RELATED APPLICATION

This application claims the benefit of U.S. Provisional Patent Application Ser. No. 61/535,699, filed Sep. 16, 2011, and U.S. Provisional Patent Application Ser. No. 61/535,677, filed Sep. 16, 2011, which applications are hereby incorporated by reference in its entirety.

TECHNICAL FIELD

The present disclosure relates to the management of fiber optic cables and more specifically to a cable retention device.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances.

Cable management arrangements for cable termination, splice, and storage come in many forms. These cable management arrangements are designed to provide organized, high density, cable termination, splice, and storage in telecommunication infrastructures that often have limited space.

Because telecommunication infrastructures are massive in scale, the original installation and subsequent adaptation of the infrastructures can be difficult to manage. Accordingly, the ability to adapt cable management arrangements and schemes is important. There is a continued need in the art for better cable management devices and arrangements.

SUMMARY

One aspect of the present disclosure relates to a fiber optic cable retention device to properly accommodate for cable management arrangements and schemes in telecommunication infrastructures that are massive in scale, have limited space, and/or require subsequent adaptation of the infrastructures.

Another aspect of the present disclosure relates to a fiber optic retention device that includes a C-shaped body and a moveable door. The C-shaped body includes a first end, a second end, an exterior flat base, and a rounded interior. The first end and the second end of the C-shaped body form an opening to the rounded interior of the C-shaped body. The first end includes a first socket. The second end includes a second socket. The exterior flat base includes at least a first flat side and a second flat side. The rounded interior extends from at least the exterior flat base. The moveable door has a first rounded end and a second rounded end. The first rounded end is configured to snap-fit into the first socket of the first end of the C-shaped body, and the second rounded end is configured to snap-fit into the second socket of the second end of the C-shaped body. The rounded interior has a curvature larger than the minimum bend radius of any fiber optic cables stored within the fiber optic cable retention device.

Yet another aspect of the present disclosure relates to a fiber optic retention device that includes a C-shaped body and a moveable door. The C-shaped body includes a first end, a second end, an exterior flat base, a first side, a second side, and a rounded interior. The first end and the second end of the C-shaped body form an opening to the rounded interior of the C-shaped body. The first side and the second side include a flat portion. The rounded interior extends from at least from the exterior flat base, the first side, and the second side. The second end includes a first reciprocally mating portion of a clip. The moveable door is attached to the first end of the C-shaped body with a living hinge. The moveable door includes a second reciprocally mating portion of the clip. The moveable door is sized to extend from the first end of the C-shaped body to the second end of the C-shaped body to close off the opening. The rounded interior has a curvature larger than the minimum bend radius of any fiber optic cables stored within the fiber optic cable retention device.

A further aspect of the present disclosure relates to a fiber optic retention device that includes a clip body. The clip body includes a first end, a second end, an exterior flat base, and a rounded interior. The exterior flat base includes at least a first flat side and a second flat side. The rounded interior extends from at least the exterior flat base. The first end of the clip body includes two flexible fingers. The two flexible fingers are configured into a closed position. The two flexible fingers get thinner as the two flexible fingers extend towards the second end. The rounded interior has a curvature larger than the minimum bend radius of any fiber optic cables stored within the fiber optic cable retention device.

Another aspect of the present disclosure relates to a fiber optic retention device that includes a C-shaped body and a moveable door. The C-shaped body includes at least one planar exterior surface. One embodiment includes a flat base, a first side, a second side, a first end, a second end, and a rounded interior. The first end includes a first space in the C-shaped body. The second end includes a second space in the C-shaped body. An opening to the rounded interior of the C-shaped body is created between the first end and the second end of the C-shaped body. The first and the second sides include a flat portion. The rounded interior extends from at least the exterior flat base, the first side, and the second side. The moveable door is moveably attached to a post extending from the first end of the C-shaped body within the first space. The moveable door includes an extension member. The moveable door is sized to extend at least substantially from the first end of the C-shaped body to the second end of the C-shaped body to at least substantially cover the opening when in a closed position. A biasing force from the extension member biases the moveable door into the closed position. Further, the rounded interior has a curvature larger than a minimum bend radius of any fiber optic cables stored within the fiber optic cable retention device.

Yet another aspect of the present disclosure relates to a fiber optic retention device that includes a C-shaped body and a door. The C-shaped body includes a base, a first side, a second side, a first end, a second end, and a rounded interior. The first end includes a first space in the C-shaped body. The second includes a second space in the C-shaped body. An opening to the rounded interior of the C-shaped body is created between the first end and the second end of the C-shaped body. At least one of the first and the second sides includes a flat portion. The rounded interior extends from at least the base, the first side, and the second side. The door is attached to a post extending from the second end of the C-shaped body within the second space. The moveable door includes an extension member. The door is sized to extend at least substantially from the second end of the C-shaped body to the first end of the C-shaped body to at least substantially cover the opening when in a closed position. A biasing force from the extension member biases the moveable post to move the door into the closed position. Further, the rounded interior has a curvature larger than a minimum bend radius of any fiber optic cables stored within the fiber optic cable retention device.

The door is moveable in a plane parallel to the base, and the front, and perpendicular to the first and second sides.

The door is mountable in plurality of positions in one embodiment, and includes an angled surface relative to the opening. In one preferred embodiment, the opening is angled.

A variety of additional aspects will be set forth in the description that follows. These aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 22 is a back view of an embodiment of a fiber optic cable retention device in accordance with the principles of the present disclosure;

FIG. 23 is a front view of an embodiment of a fiber optic cable retention device in accordance with the principles of the present disclosure;

FIG. 24 is a top view of a fiber optic cable retention device in accordance with the principles of the present disclosure;

FIG. 25 is a bottom view of a fiber optic cable retention device in accordance with the principles of the present disclosure;

FIG. 28 is an isometric view of an embodiment of a fiber optic cable retention device in accordance with the principles of the present disclosure;

FIG. 29 is a first side view of an embodiment of a fiber optic cable retention device in accordance with the principles of the present disclosure;

FIG. 32 is a back view of an embodiment of a fiber optic cable retention device in accordance with the principles of the present disclosure;

FIG. 33 is a front view of a fiber optic cable retention device in accordance with the principles of the present disclosure;

FIG. 34 is a top view of an embodiment of a fiber optic cable retention device in accordance with the principles of the present disclosure;

FIG. 35 is a bottom view of an embodiment of a fiber optic cable retention device in accordance with the principles of the present disclosure;

DETAILED DESCRIPTION

Figure 1:
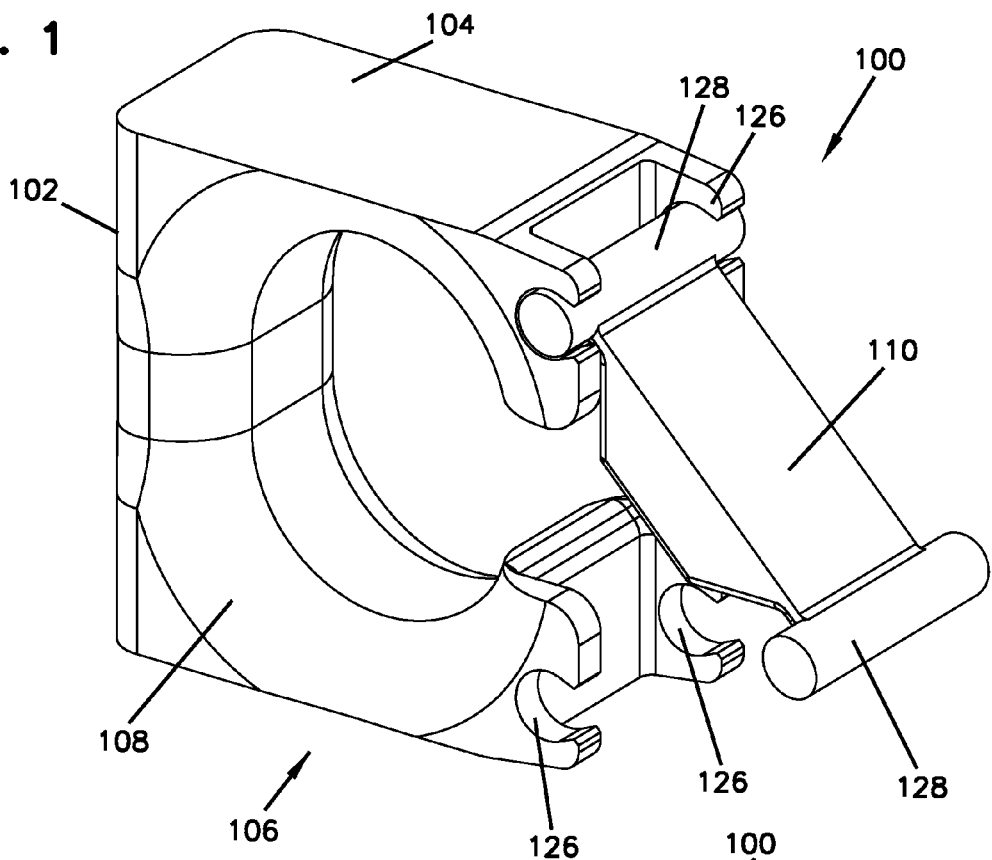
FIG. 1 is an isometric, first side view of an embodiment of a fiber optic cable retention device in accordance with the principles of the present disclosure.

FIGS. 1-25 illustrate various embodiments of a fiber optic cable retention device 100 in accordance with the principles of the present disclosure. The fiber optic cable retention device 100 has a body having a flat base 102, a first end 105, a second end 107, and a rounded interior 108. The fiber optic cable retention device 100 allows for at least one fiber optic cable to be inserted, stored, and removed from the rounded interior 108 of the retention device 100. Further, the designs and/or configurations of the retention devices 100 disclosed herein allow for quick and easy insertion, storage, and removal of the fiber optic cables. Accordingly, the retention devices 100 described herein are easily adaptable to properly accommodate for cable management arrangements and schemes in telecommunication infrastructures that are massive in scale, have limited space, and/or require subsequent adaptation of the infrastructures.

FIGS. 1-18 illustrate some embodiments of the fiber optic cable retention device 100 in accordance with the principles of the present disclosure. In this embodiment, the retention device 100 includes a C-shaped body having a first end 105, a second end 107, an exterior flat base 102, and a rounded interior 108. The size and shape of the C-shaped body may be adjusted as needed for fitting into and providing the best cable management in the telecommunication infrastructures as long as the curvature of the rounded interior 108 is larger than the minimum bend radius of the fiber optic cables to prevent signal degradation of stored fiber optic cables.

The flat base 102 is a planar surface that faces the exterior of the retention device 100 and is entirely flat. The flat base of the retention device 100 provides for easy installation and/or attachment within cable management arrangements and schemes in telecommunication infrastructures. The flat base 102 is configured for mounting the fiber optic cable retention device 100 to a surface, such as panel, plate, and/or cabinet. The mounting of the fiber optic cable retention device 100 allows the fiber optic cable retention device 100 hold fiber optic cables in place and/or manage various cables near, next to, adjacent, or within telecommunication infrastructures. In some embodiments, the flat base further includes a pin 140 and/or a hole 142 for mounting the retention device 100 to a surface. The pin 140 and hole 142 may be utilize together or individually for mounting the retention device 100 to a surface.

The flat base 102 includes a first side 104 and second side 106. The first side 104 and second side 106 extend from the flat base 102 and also face the exterior of the retention device 100. In some embodiments, the first side 104 and/or the second side 106 are planar surfaces that are entirely flat, as illustrated in FIGS. 8-14 and 30-35. In some embodiments, not illustrated, the first side 104 and/or the second side 106 include only a portion that is flat. In further embodiments, the first side 104 and/or the second side 106 includes a pin 140 and/or a hole 142 for mounting the retention device 100 to a surface.

In some embodiments, the flat base 102 includes a third side. In some embodiments, the flat base 102 includes a fourth side. In other embodiments, the flat base 102 includes a third side and a fourth side. The third side extends from the first side 104 and the fourth side extends from the second side 106. In some embodiments, the third side and/or the fourth side is a planar surface and entirely flat. In some embodiments, the third side and/or the fourth side include a portion that is flat. In other embodiments, the third and/or fourth side do not include a flat portion. For example, in some embodiments, not illustrated, the retention device 100 includes a third side that does not have a flat portion, since it is rounded and a fourth side that is entirely flat. In other embodiments, not shown, both the third and fourth sides of the retention device 100 are rounded and do not include a flat portion. In some embodiments, not shown, both the third and fourth sides of the retention device 100 include a flat portion.

The rounded interior 108 faces the interior of the retention device 100 and extends from the flat base 102 including at least the first side 104 and second side 106. In some embodiments, the rounded interior 108 further extends from any third and/or fourth side if present in the retention device 100. The curvature of the rounded interior 108 is larger than the minimum bend radius of the fiber optic cables to prevent signal degradation of stored fiber optic cables. Further, the curvature of the rounded interior 108 forms the C-shape of the body of the retention device 100.

The first end 105 and the second end 107 of the C-shaped body form an opening to the rounded interior 108 of the C-shaped body. The opening is sized and/or configured to allow at least one fiber optic cable to pass through the opening at a time. However, a door 110 attached to the C-shaped body is configured and/or sized so that the door 110 in a closed position at least substantially covers the opening. The opening is substantially closed off or covered if a single fiber optic cable could not pass through the space provided between one end (105 or 107) of the C-shaped body and the door 110. In the closed position, fiber optic cables cannot be added to or removed from the interior of the retention device 100. For instance, FIGS. 3, 4, 8, and 13-15 illustrate a retention device 100 with a door 110 in a closed position.

Figure 2:
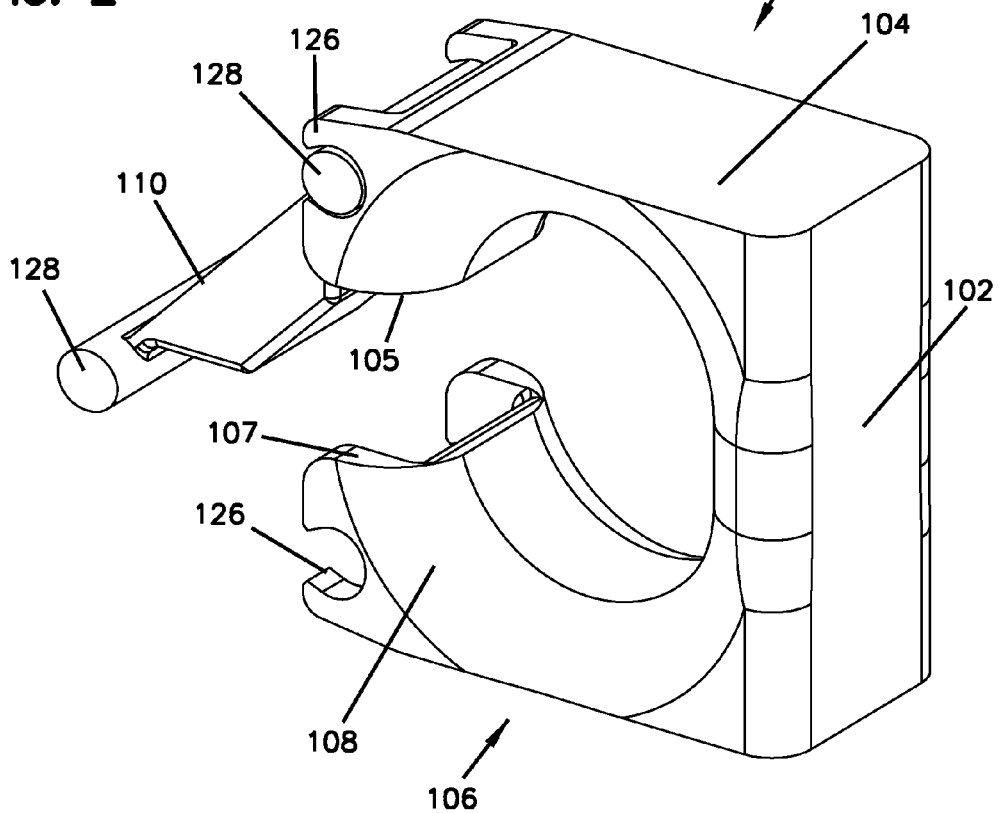
FIG. 2 is an isometric, second side view of an embodiment of a fiber optic cable retention device in accordance with the principles of the present disclosure.
Figure 3:
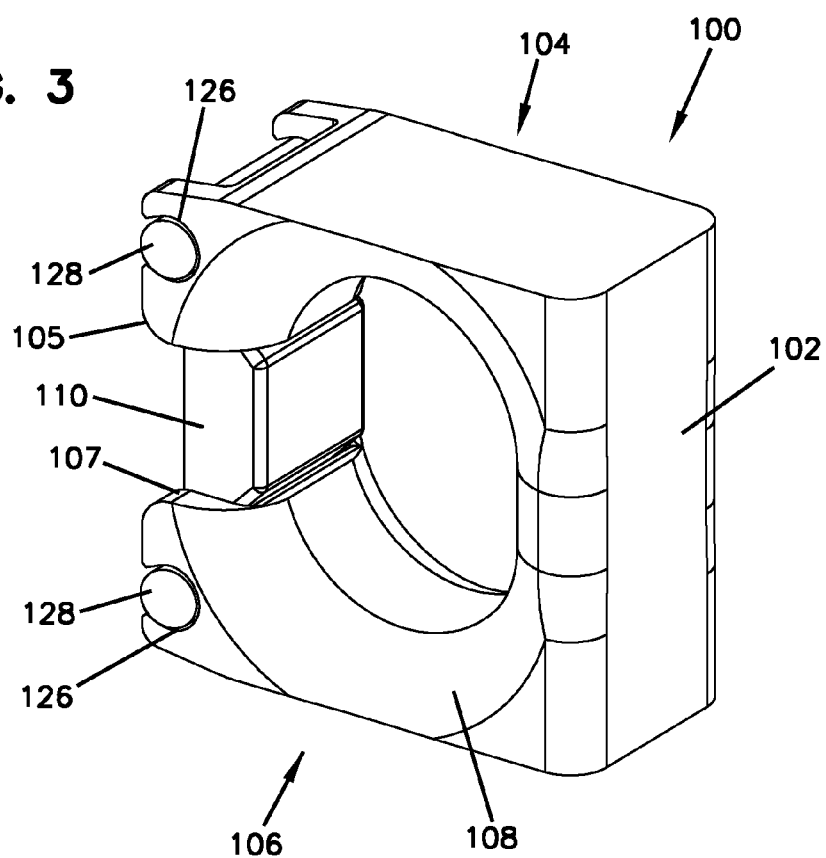
FIG. 3 is an isometric, second side view of an embodiment of a fiber optic cable retention device in accordance with the principles of the present disclosure.
Figure 4:
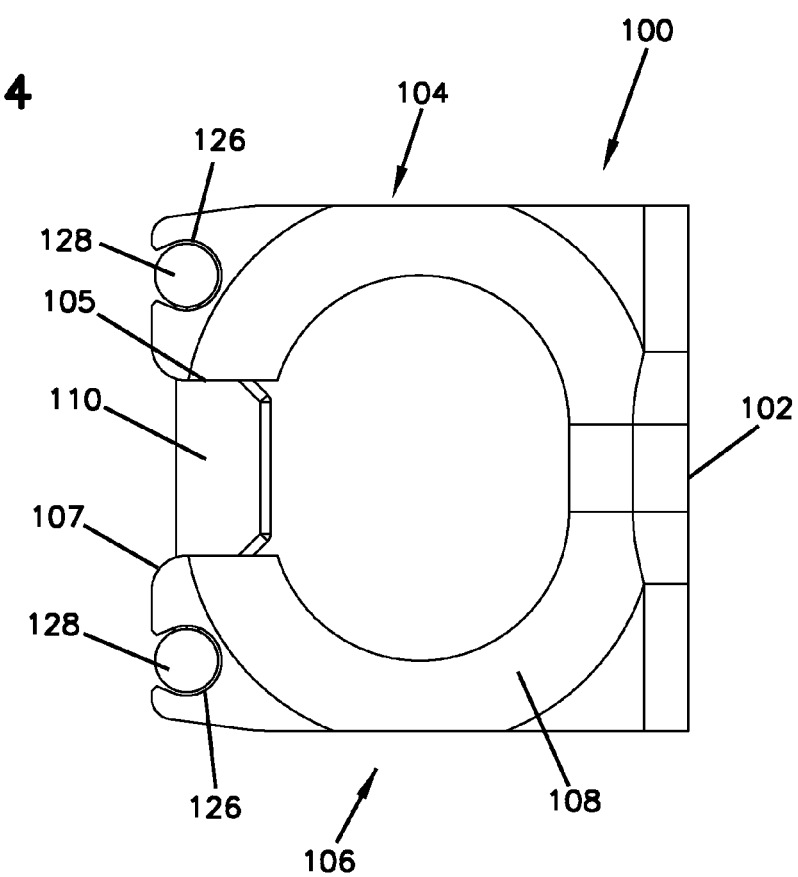
FIG. 4 is a second side view of an embodiment of a fiber optic cable retention device in accordance with the principles of the present disclosure.
Figure 5:
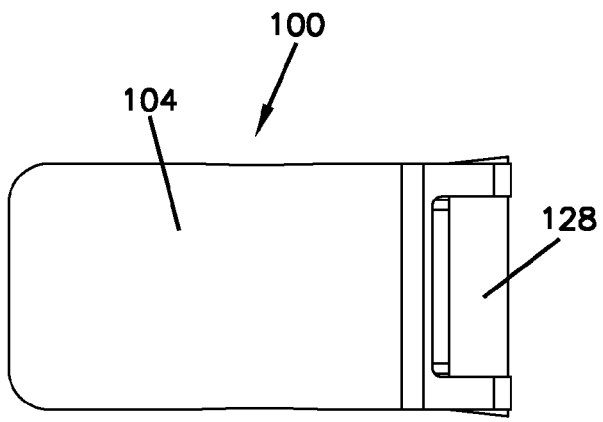
FIG. 5 is a top view of a fiber optic cable retention device in accordance with the principles of the present disclosure.
Figure 6:
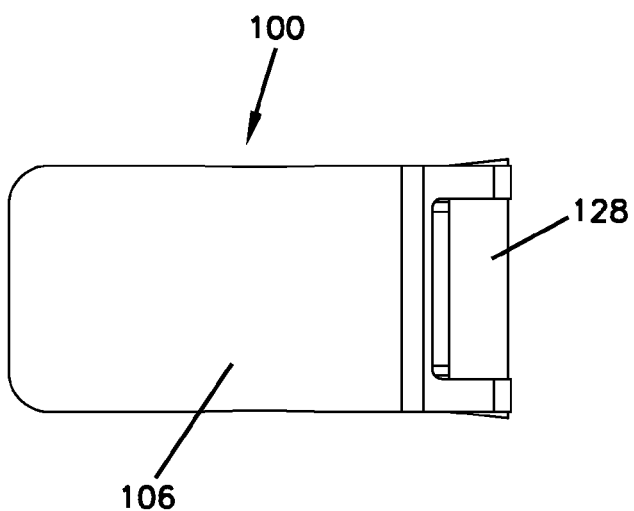
FIG. 6 is a bottom view of a fiber optic cable retention device in accordance with the principles of the present disclosure.
Figure 7:
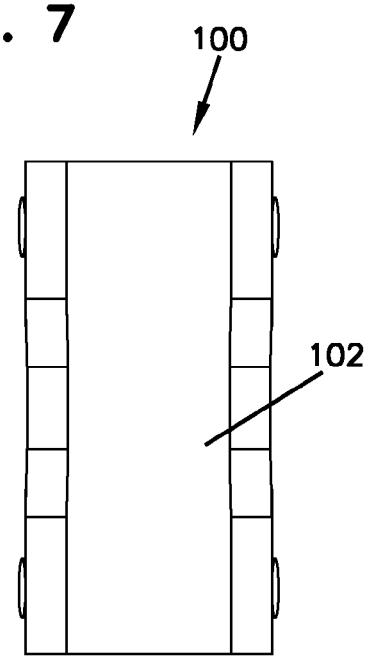
FIG. 7 is a back view of an embodiment of a fiber optic cable retention device in accordance with the principles of the present disclosure.
Figure 8:
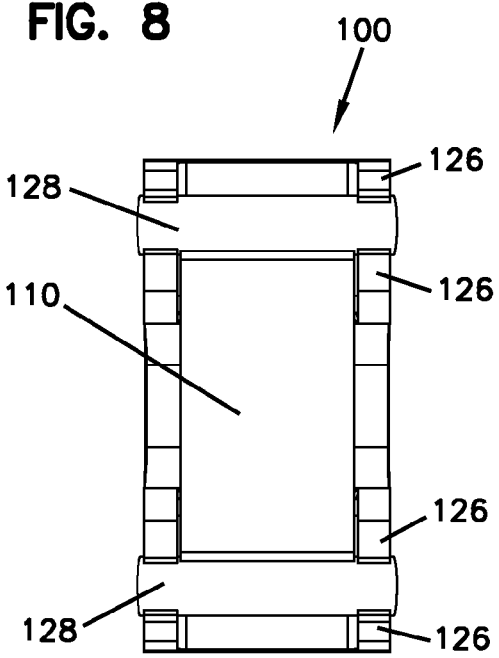
FIG. 8 is a front view of an embodiment of a fiber optic cable retention device in accordance with the principles of the present disclosure.
Figure 9:
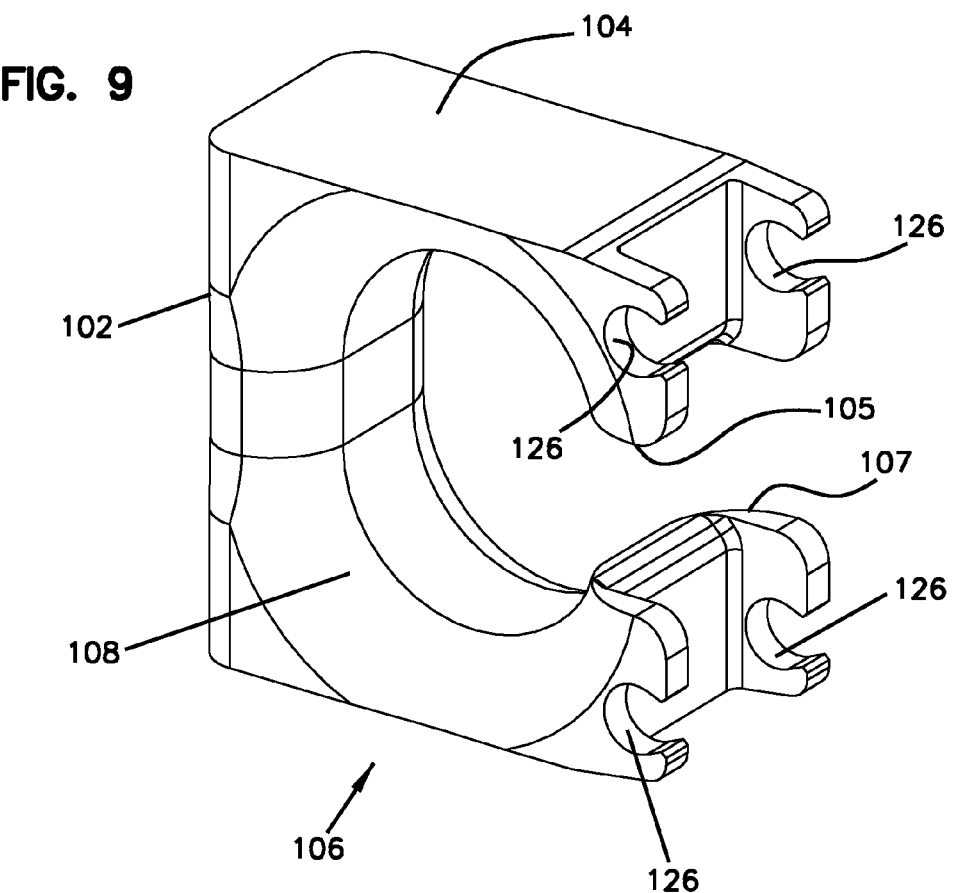
FIG. 9 is an isometric, first side view of an embodiment of a fiber optic cable retention device without an attached door in accordance with the principles of the present disclosure.
Figure 10:
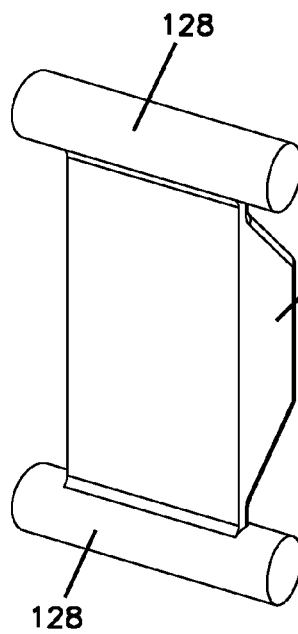
FIG. 10 is an isometric, first side view of an embodiment of a door for a fiber optic cable retention device in accordance with the principles of the present disclosure.
Figure 11:
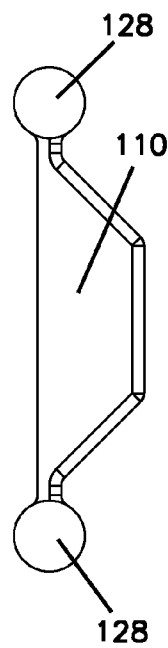
FIG. 11 is a first side view of an embodiment of a door for a fiber optic cable retention device in accordance with the principles of the present disclosure.
Figure 12:
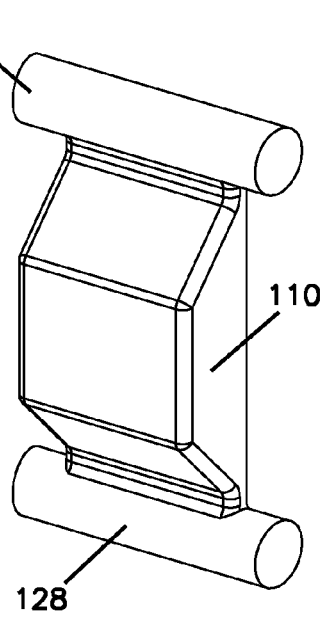
FIG. 12 is an isometric, second side view of an embodiment of a door for a fiber optic cable retention device in accordance with the principles of the present disclosure.

The door 110 is moveable into an open position. The door 110 is in an open position when the space between the door 110 and one end (105 or 107) of the C-shaped body is at least wide enough for a single fiber optic cable to pass through the opening between the door 110 and one end (105 or 107) of the C-shaped body. In some embodiments, the open position may allow for multiple fiber optic cables to pass through the opening at one time between the door 110 and one end (105 or 107) of the C-shaped body. In other embodiments, the open position may include the complete removal of the door 110 from the C-shaped body. In the open position, fiber optic cables may be added to or removed from the interior of the retention device 100. For instance, FIGS. 1, 2, and 9 illustrate a retention device 100 with a door 110 in an open position.

The door 110 may be moveably attached to the C-shaped body by a number of various mechanisms. In some embodiments, the door 110 is snap-fit and/or rotationally attached to the C-shaped body as illustrated in FIGS. 1-12. In these embodiments, the C-shaped body includes a receiving area or a socket 126 on the first end 105 and the second end 107 of the C-shaped body for receiving a first rounded end 128 and a second rounded end 128 of the door 110. In these embodiments each rounded end 128 of the door 110 may snap-fit into a socket 126 of the C-shaped body. The socket 126 is configured and/or designed to allow the door 110 to rotate and/or pivot within the socket 126 if one rounded end 128 is not attached or snap-fit into a socket 126 of the C-shaped body. The door 110, in this embodiment, may be completely removed from the C-shaped body. Further, in these embodiments, if both rounded ends 128 of the C-shaped body are snap-fit and/or attached to the sockets 126 of the C-shaped body, then the opening is completely covered by the door 110 (i.e., the door is in a closed position) and the door 110 does not move, rotate, and/or pivot.

In other embodiments, the door 110 is manually moved into the closed position as illustrated in FIGS. 1-4 and 8. In these embodiments, one or both rounded ends 128 may be removable from the sockets 126. Each rounded end 128 has to be snap-fit into the sockets 126 to position the door 110 in the closed position. If one rounded end 128 is removable from the socket 126, then the removable rounded end 128 must be removed from the socket 126 to position the door 110 in the open position. If both rounded ends 128 are removable from the socket 126, then at least one rounded end 128 must be removed from a socket 126 to position the door 110 in the open position. The non-removable rounded end 128 moves, rotates, and/or pivots within the socket 126 to position the door 110 in the open position. If both rounded ends 128 are removable from the socket 126, then both rounded ends 128 may be removed from their sockets 126 to completely remove the door 110 from the C-shaped body.

Figure 13:
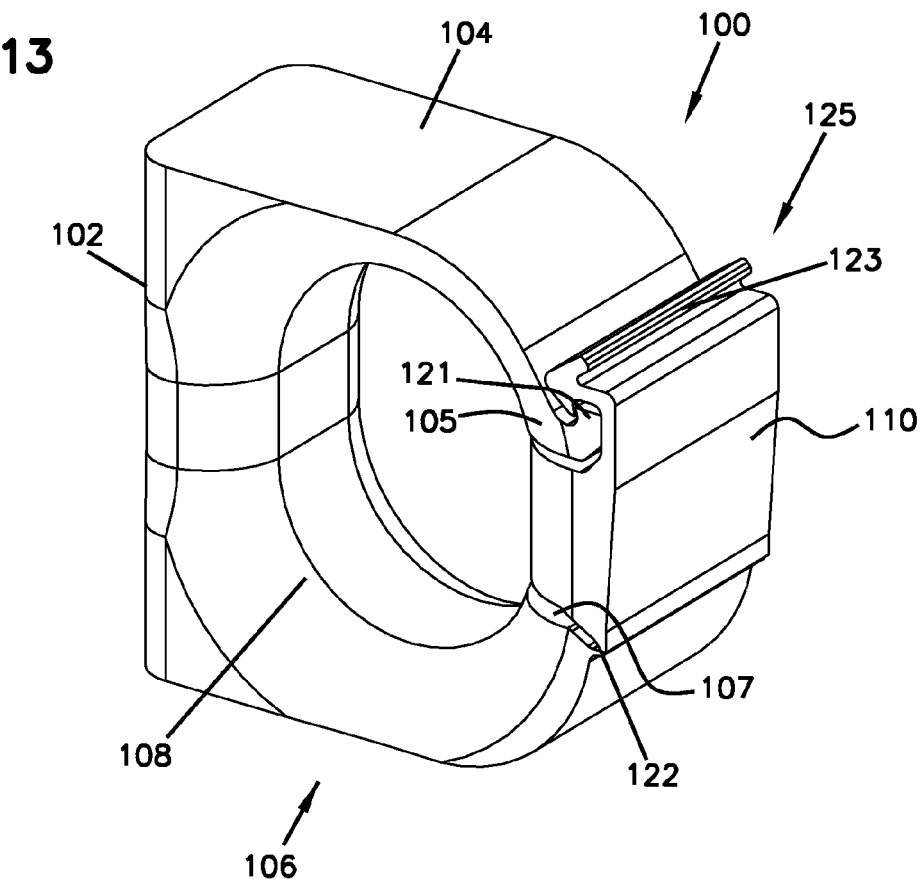
FIG. 13 is an isometric, first side view of an embodiment of a fiber optic cable retention device in accordance with the principles of the present disclosure.
Figure 14:
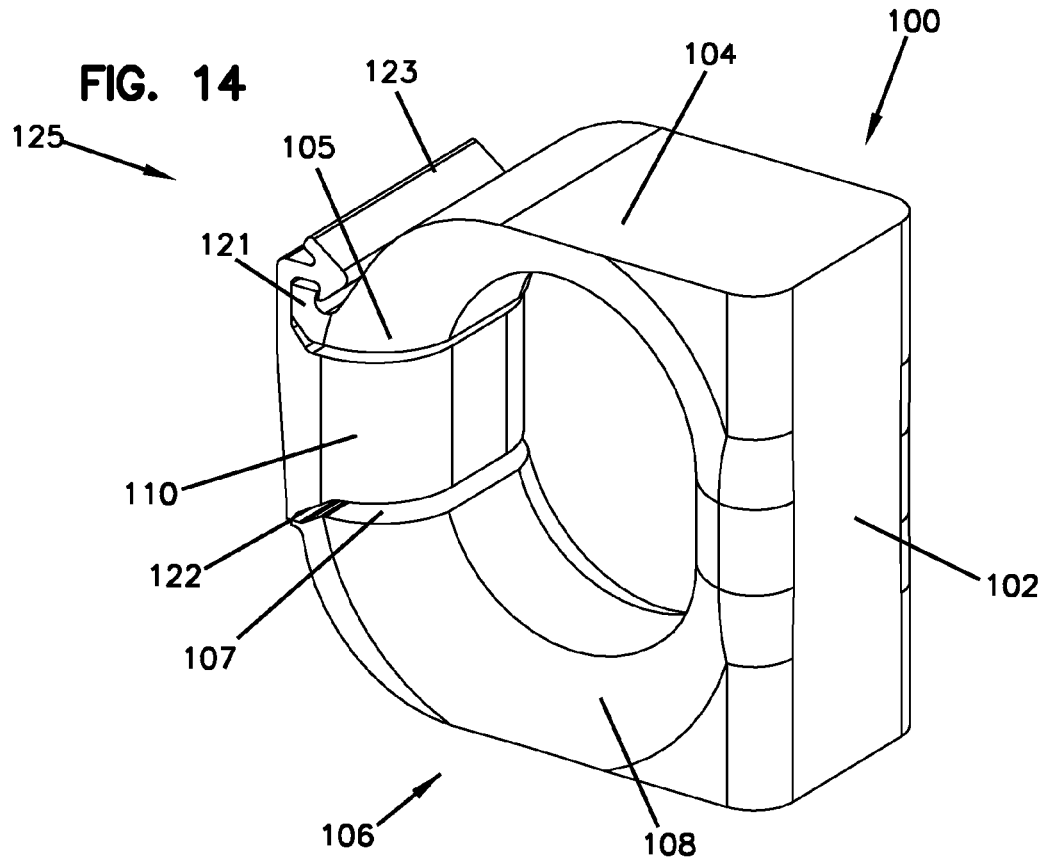
FIG. 14 is an isometric, second side view of an embodiment of a fiber optic cable retention device in accordance with the principles of the present disclosure.
Figure 15:
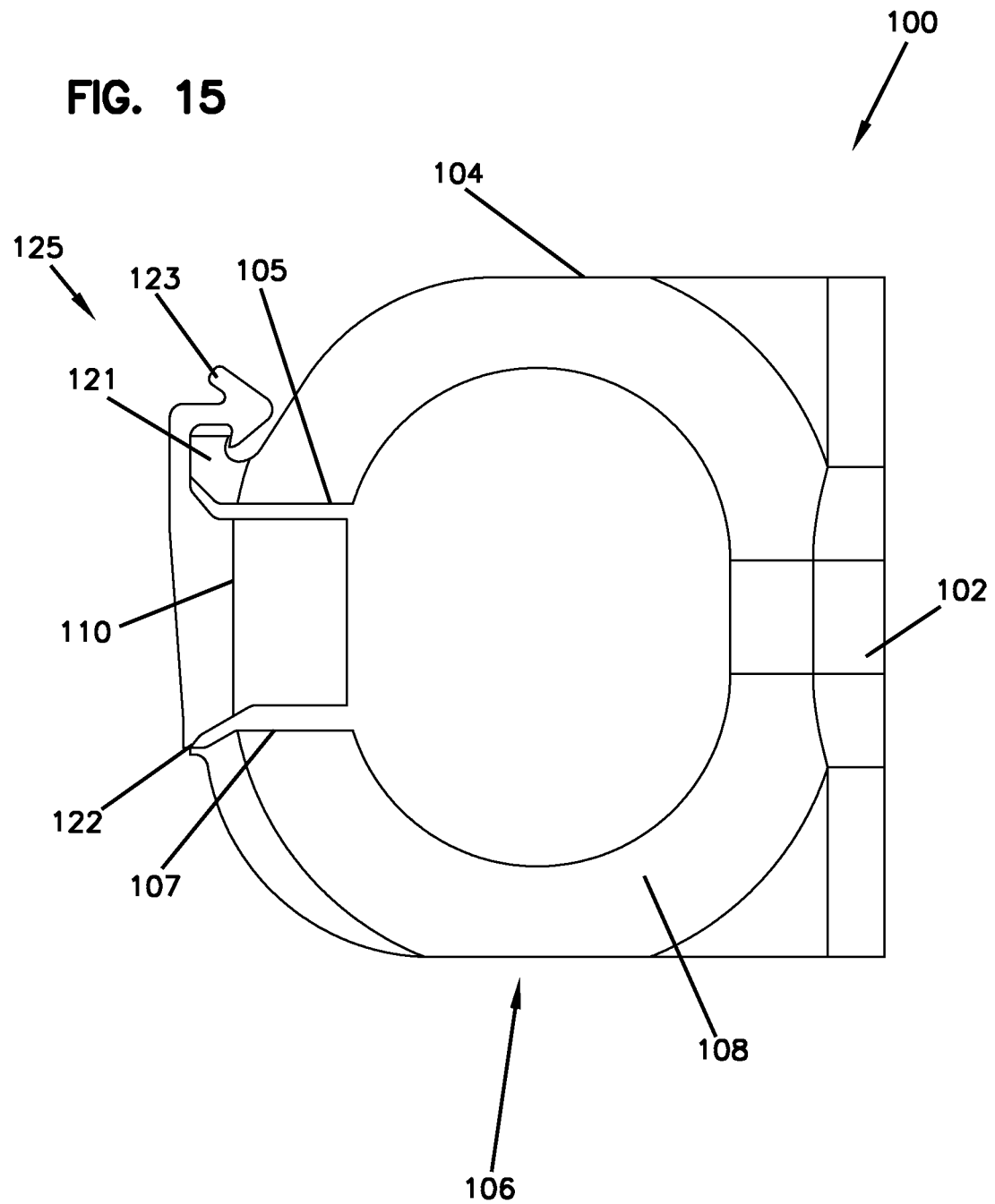
FIG. 15 is a second side view of an embodiment of a fiber optic cable retention device in accordance with the principles of the present disclosure.
Figure 16:
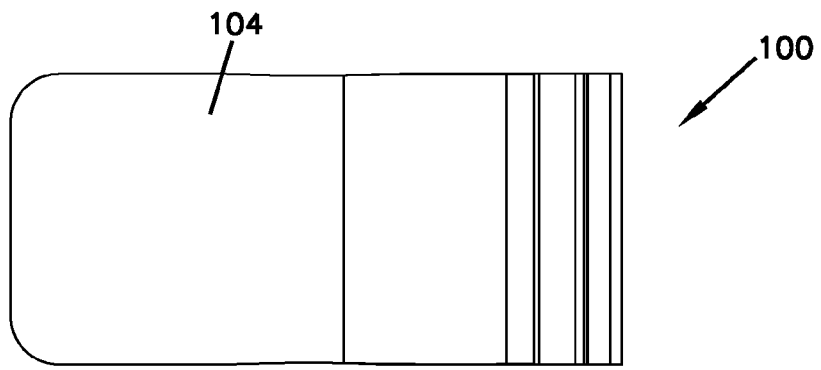
FIG. 16 is a top view of an embodiment of a fiber optic cable retention device in accordance with the principles of the present disclosure.
Figure 17:
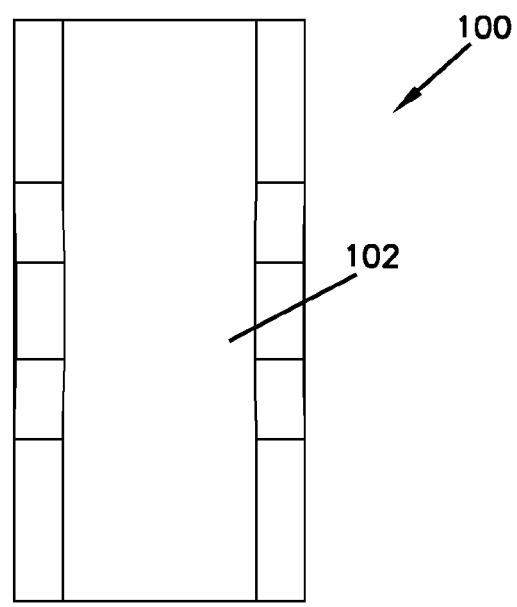
FIG. 17 is back view of an embodiment of a fiber optic cable retention device in accordance with the principles of the present disclosure.
Figure 18:
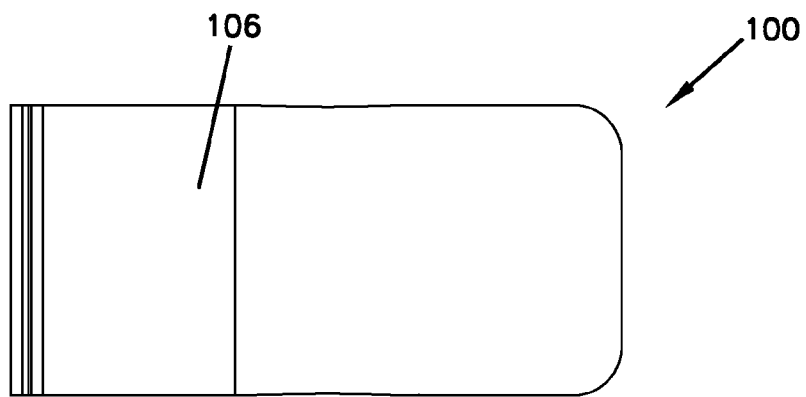
FIG. 18 is a bottom view of a fiber optic cable retention device in accordance with the principles of the present disclosure.
Figure 19:
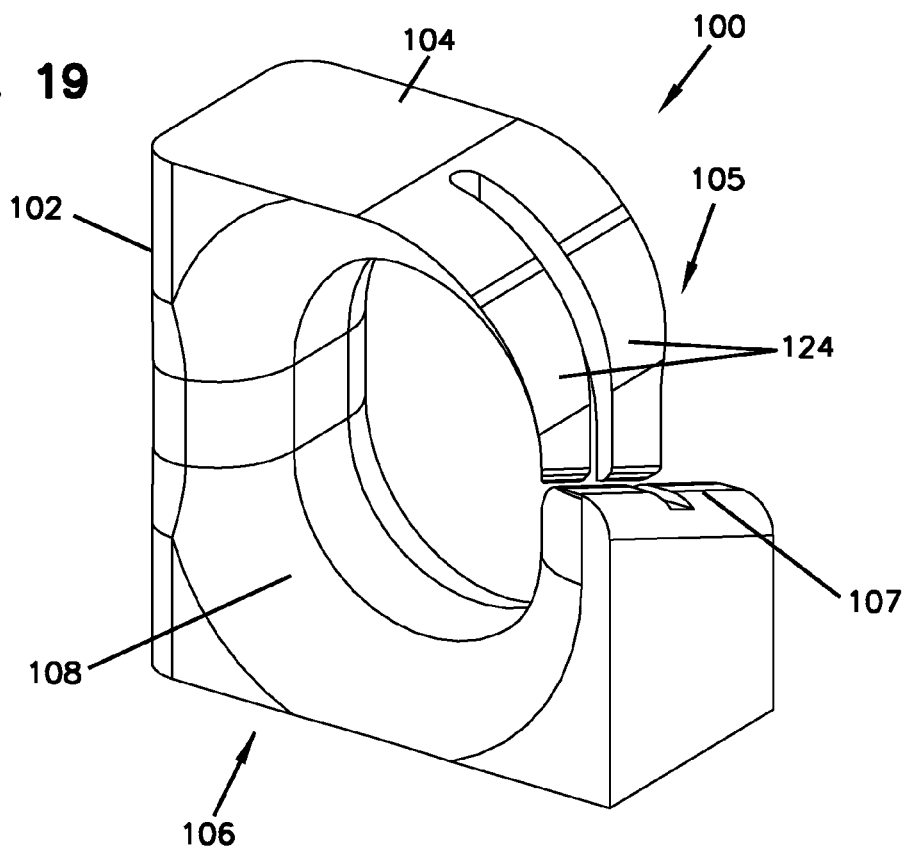
FIG. 19 is an isometric, first side view of an embodiment of a fiber optic cable retention device in accordance with the principles of the present disclosure.
Figure 20:
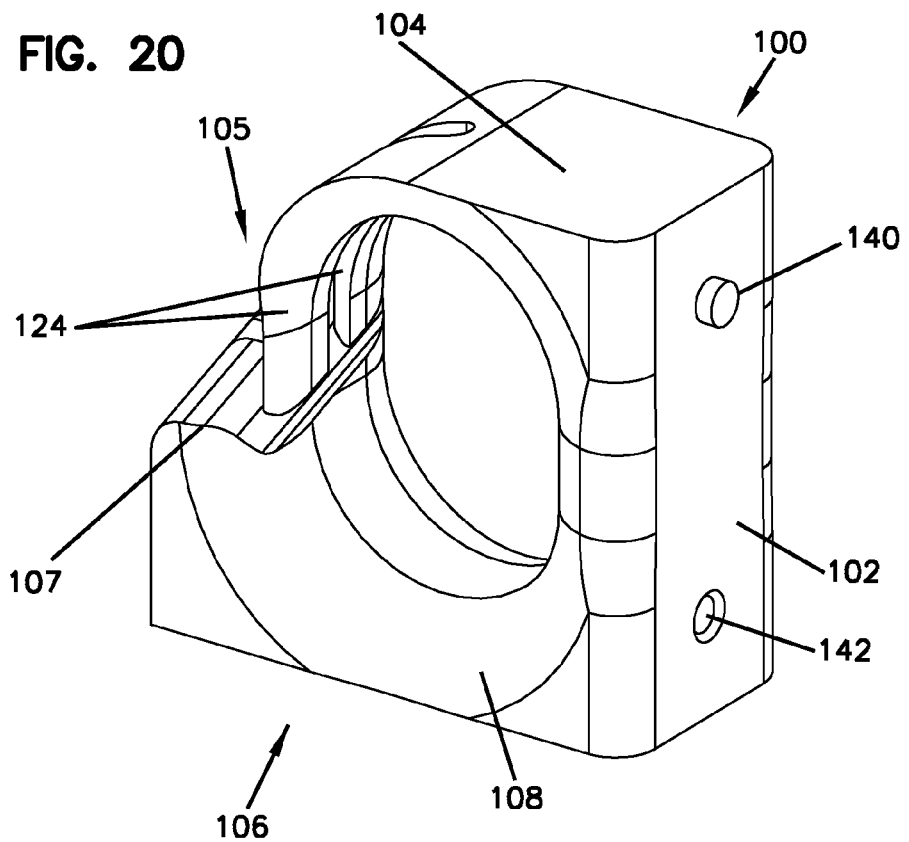
FIG. 20 is an isometric, second side view of an embodiment of a fiber optic cable retention device in accordance with the principles of the present disclosure.

In some embodiments, the door 110 is attached to one end (105 or 107) of the C-shaped body via a living hinge 122 as illustrated in FIGS. 13-15. The door 110 is held in a closed position with a clip 125 as illustrated in FIGS. 13-15. The clip includes reciprocally matting portions 121 and 123. The door 110 includes one of the two reciprocally mating portions of the clip 125. The end (105 or 107) opposite the living hinge 122 or a portion of the C-shaped body opposite the living hinge 122 includes one of the two reciprocally mating portion of the clip 125. For example, the matting portions 121 and 123 may include two mating hooks, a mating hook and tab, or a mating tab and projection. For example, as illustrated in FIGS. 13-15, an arrow shaped hook 123 mates with a tab 121 on the clip 125 to hold the door 110 in a closed position. In this example, when the arrow shaped hook 123 is removed or detached from the tab 121, the door 110 may be moved via the living hinge 122 into an open position.

The living hinge 122 attaches the door 110 to an end (105 or 107) of the C-shaped body. The door 110 may be attached to the interior or exterior of the C-shaped body via the living hinge 122. The living hinge 122 allows the door 110 to open towards the exterior of the C-shaped body once the reciprocally mating portions 121 and 123 are detached from each other. The door 110 is moved via the living hinge 122 towards the interior of the C-shaped body until the reciprocally mating portions 121 and 123 of the clip 125 mate or interlock with each other. The door 110 is in a closed position when the reciprocally matting portions 121 and 123 mate or interlock with each other, as illustrated in FIGS. 13-15. The door 110 is in the open position when the reciprocally mating portions 121 and 123 are detached or separated from each other. The door 110 may be moved via the living hinge to the door open position by applying a force to open the clip 125. The door 110 may be moved via the living hinge to the door closed position by applying a force to the door 110 until the reciprocally mating portions 121 and 123 of the clip 125 engage or mate with each other. The force may be the manual application of force by an operator, installer, or user of the telecommunication infrastructures.

FIGS. 19-25 illustrate example embodiments of a fiber optic retention device 100. FIGS. 19-25 illustrate and embodiment of a retention device 100 including a clip body having a first end 105, a second end 107, an exterior flat base 102, and a rounded interior 108.

The flat base 102 is a planar surface that faces the exterior of the retention device 100 and is entirely flat. In some embodiments, the flat base 102 is configured for mounting the fiber optic cable retention device 100 to a surface, such as panel, plate, and/or cabinet. The mounting of the fiber optic cable retention device 100 allows the fiber optic cable retention device 100 hold fiber optic cables in place and/or manage various cables near, next to, adjacent, or within telecommunication infrastructures. In some embodiments, the flat base further includes a pin 140 and/or a hole 142 for mounting the retention device 100 to a surface. The pin 140 and hole 142 may be utilize together or individually for mounting the retention device 100 to a surface.

The flat base 102 includes a first side 104 and a second side 106. The first side 104 and second side 106 extend from the flat base 102 and also face the exterior of the retention device 100. In some embodiments, the first side 104 and/or the second side 106 are planar surfaces that are entirely flat, as illustrated in FIGS. 1-4, 6, and 7. In some embodiments, the first side 104 and/or the second side 106 include only a portion that is flat. In further embodiments, the first side 104 and/or the second side 106 includes a pin 140 and/or a hole 142 for mounting the retention device 100 to a surface.

In some embodiments, the flat base 102 includes a third side. The third side extends from the first side 104 or second side 106. In some embodiments, the third side is a planar surface and entirely flat. In some embodiments, the third side includes a portion that is flat. In other embodiments, the third side does not include a flat portion. For example, FIGS. 19-21 and 23 illustrate a third side that is entirely flat.

The rounded interior 108 faces the interior of the retention device 100 and extends from the flat base 102 including at least the first side 104 and the second side 106. In some embodiments, the rounded interior 108 further extends from any third side if present in the retention device 100. As discussed above, the curvature of the rounded interior 108 is larger than the minimum bend radius of the fiber optic cables to prevent signal degradation of stored fiber optic cables.

The first end 105 of the clip body includes two flexible fingers 124. In some embodiments, the two flexible fingers 124 get thinner longitudinally and/or laterally as the two flexible fingers 124 extend towards the second end 107. Accordingly, in these embodiments, the portion of the two flexible fingers 124 closest to the second end 107 are the thinnest. Further, in some embodiments, the thinner the portion of the two flexible fingers 124, the more flexible the two flexible fingers 124 are at that portion.

Figure 21:
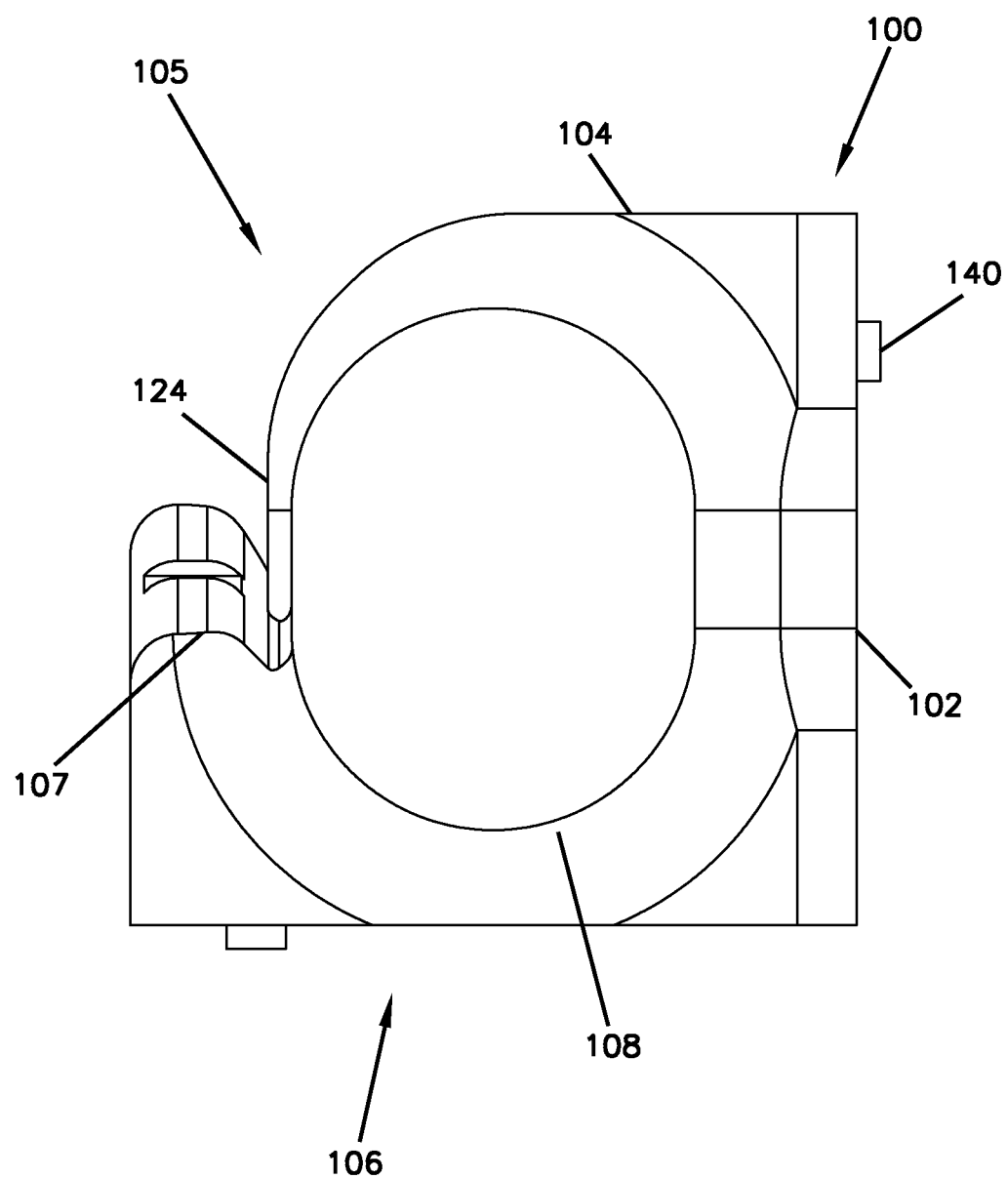
FIG. 21 is a second side view of an embodiment of a fiber optic cable retention device in accordance with the principles of the present disclosure.

The two flexible fingers 124 are configured into a closed position with the second end 107. The two flexible fingers 124 are in a closed position when the two flexible fingers 124 substantially close off the interior of the clip body by preventing a single fiber optic cable from passing through the space provided between the two flexible fingers 124 of the clip body and the second end 107. In the closed position, fiber optic cables cannot be added to or removed from the interior of the retention device 100. In some embodiments, the two fingers 124 extend past the second end 107 in the closed position as illustrated in FIGS. 21 and 23. Accordingly, the extended two fingers 124 help to prevent fiber optic cables retained within the retention device 100 from being able to pass out of the retention device 100 without some type of manual assistance. Therefore, the extended two fingers 124 provide for better cable retention and security.

In further embodiments, the two flexible fingers 124 are biased into a closed position with the second end 107. In these embodiments, if the two flexible fingers 124 extend toward the exterior of the second end 107, the two flexible fingers 124 are biased toward the interior of the clip body. In these embodiments, if the two flexible fingers 124 extend toward the interior of the second end 107, the two flexible fingers 124 are biased toward the exterior of the clip body as illustrated in FIGS. 19-21 and 23.

However, the two flexible fingers 124 are moveable into an open position to form an opening to the interior of the clip body between the first end 105 and the second end 107. The two flexible fingers 124 are in an open position when the space between the two flexible fingers 124 and the second end 107 of the clip body is at least wide enough for a single fiber optic cable to pass through the opening between the two flexible fingers 124 and the second end 107 of the C-shaped body. In some embodiments, the open position may allow for multiple fiber optic cables to pass through the opening at one time between the two flexible fingers 124 and the second end 107 of the clip body. In the open position, fiber optic cables may be added to or removed from the interior of the retention device 100. In embodiments where the two flexible fingers 124 are biased, the two flexible fingers 124 are moved into an open position by applying a force to the two flexible fingers 124 in a direction opposite to the biasing direction. For example, the door 110 may be opened via a force from at least one fiber optic cable pushing up against the flexible fingers 124. Once the cable has reached the interior of the C-shaped body and/or passes over the flexible fingers 124, the flexible fingers 124 are biased back into the closed position. Accordingly, the flexible fingers 124 provide for a fast, easy, and/or efficient process for storing and/or managing cables in a telecommunication infrastructure.

FIGS. 26-41 illustrate various additional embodiments of a fiber optic cable retention device 100 or portion of the fiber optic cable retention device 100 in accordance with the principles of the present disclosure. The fiber optic cable retention device 100 has a body having a flat base 102, a first end 105, a second end 107, and a rounded interior 108. The fiber optic cable retention device 100 allows for at least one fiber optic cable to be inserted, stored, and removed from the rounded interior 108 of the retention device 100. Further, the designs and/or configurations of the retention devices 100 disclosed herein allow for quick and easy insertion, storage, and removal of the fiber optic cables. Accordingly, the retention devices 100 described herein are easily adaptable to properly accommodate for cable management arrangements and schemes in telecommunication infrastructures that are massive in scale, have limited space, and/or require subsequent adaptation of the infrastructures.

The flat base 102 is a planar surface that faces the exterior of the retention device 100 and is defines a plane. The flat base of the retention device 100 provides for easy installation and/or attachment within cable management arrangements and schemes in telecommunication infrastructures. The flat base 102 is configured for mounting the fiber optic cable retention device 100 to a surface, such as panel, plate, and/or cabinet. The mounting of the fiber optic cable retention device 100 allows the fiber optic cable retention device 100 hold fiber optic cables 116 in place and/or manage various cables near, next to, adjacent, or within telecommunication infrastructures. In some embodiments, the flat base further includes a pin 140 and/or a hole 142 for mounting the retention device 100 to a surface. The pin 140 and hole 142 may be utilized together or individually for mounting the retention device 100 to a surface.

The flat base 102 includes a first side 104 and second side 106. The first side 104 and second side 106 extend from the flat base 102 and also face the exterior of the retention device 100. In some embodiments, the first side 104 and/or the second side 106 are planar surfaces that are entirely flat. In some embodiments, the first side 104 and/or the second side 106 include a portion 118 that is flat as illustrated in FIGS. 26-28, 30, 31, 34, 35, 39, and 40. In further embodiments, the first side 104 and/or the second side 106 includes a pin 140 and/or a hole 142 for mounting the retention device 100 to a surface.

In some embodiments, the flat base 102 includes a third side. In some embodiments, the flat base 102 includes a fourth side. In other embodiments, the flat base 102 includes a third side and a fourth side. The third side extends from the first side and the fourth side extends from the second side. In some embodiments, the third side and/or the fourth side is a planar surface and entirely flat. In some embodiments, the third side and/or the fourth side include a portion that is flat. In other embodiments, the third and/or fourth sides do not include a flat portion. For example, in some embodiments, the retention device 100 includes a third side that does not have a flat portion, since it is rounded and a fourth side that is entirely flat. In other embodiments, both the third and fourth sides of the retention device 100 are rounded and do not include a flat portion.

The rounded interior 108 faces the interior of the retention device 100 and extends from the flat base 102 including at least the first side 104 and second side 106. In some embodiments, the rounded interior 108 further extends from any third and/or fourth side if present in the retention device 100. The curvature of the rounded interior 108 is larger than the minimum bend radius of the fiber optic cables to prevent signal degradation of stored fiber optic cables. Further, the curvature of the rounded interior 108 forms the C-shape of the body of the retention device 100. The size and shape of the C-shaped body may be adjusted as needed for fitting into and providing the best cable management in the telecommunication infrastructures as long as the curvature of the rounded interior 108 is larger than the minimum bend radius of the fiber optic cables to prevent signal degradation of stored fiber optic cables.

Figure 38:
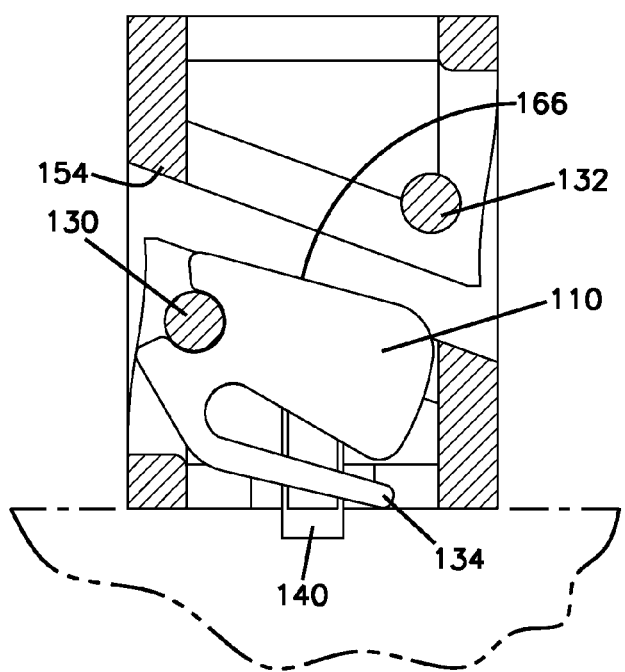
FIG. 38 is a cross-sectional, front view of a fiber optic cable retention device and a door in an open position in accordance with the principles of the present disclosure.
Figure 39:
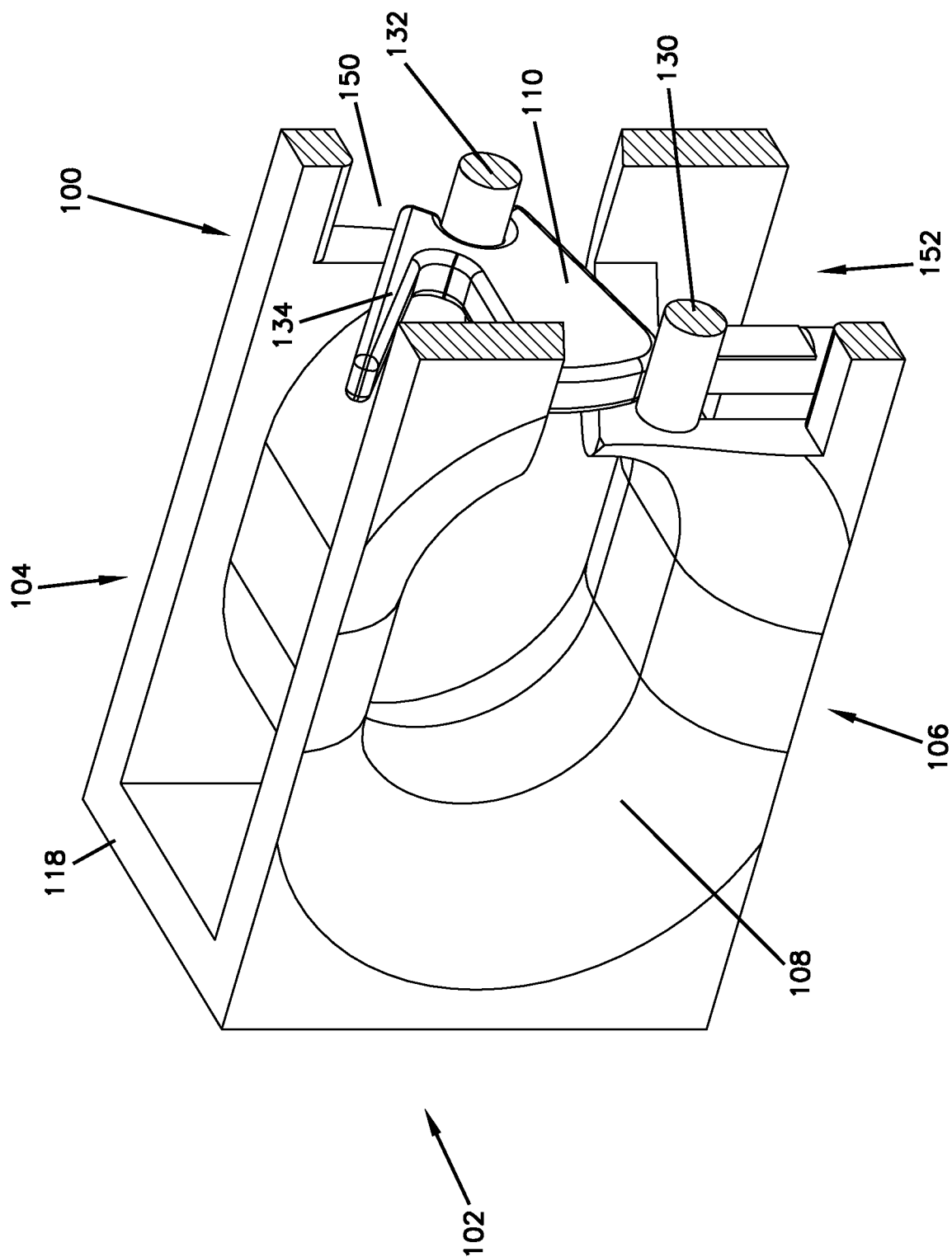
FIG. 39 is an isometric, cross-sectional first side view of a fiber optic cable retention device in accordance with the principles of the present disclosure.
Figure 40:
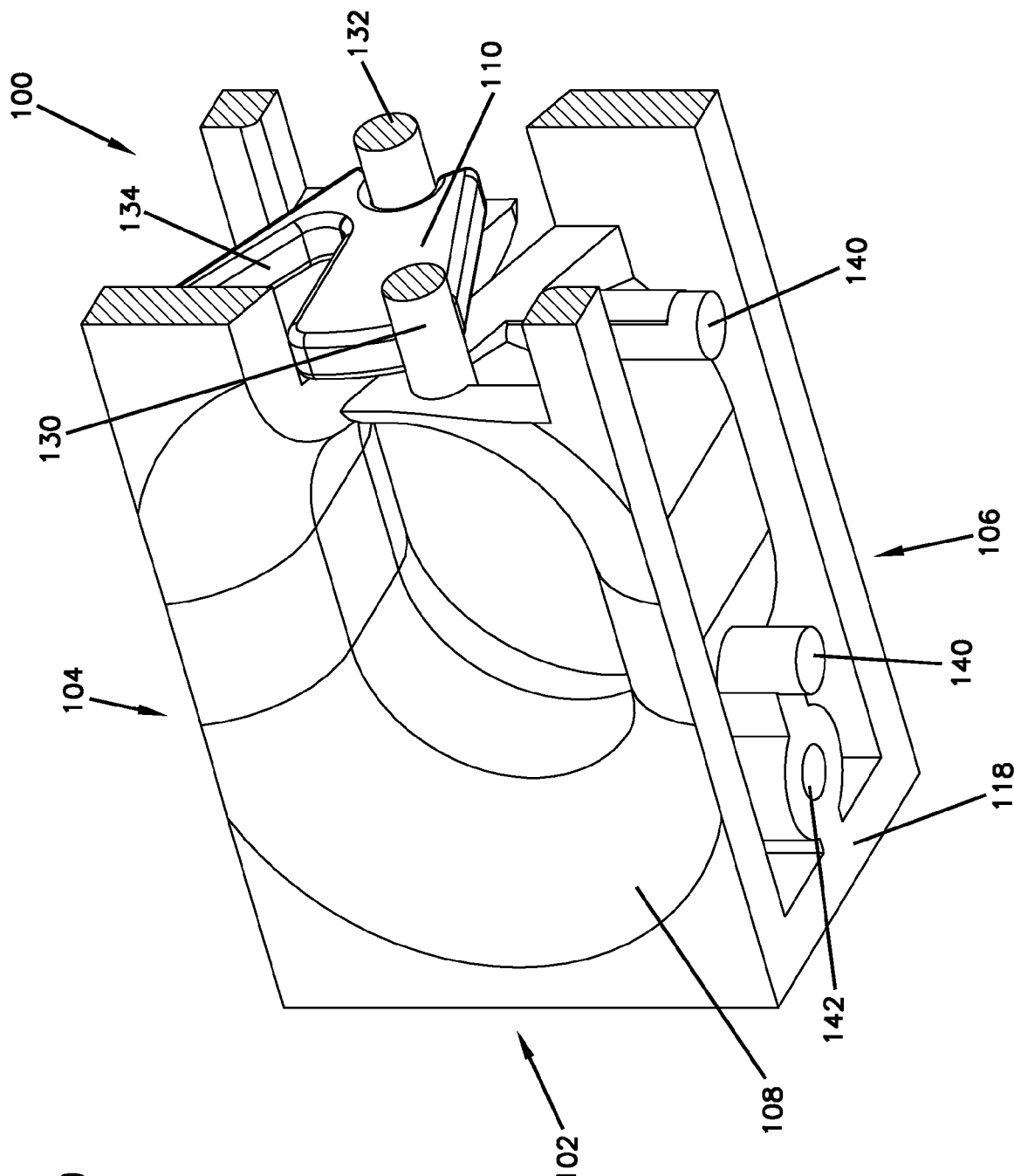
FIG. 40 is an isometric, cross-sectional view of an embodiment of a fiber optic cable retention device in accordance with the principles of the present disclosure.
Figure 41:
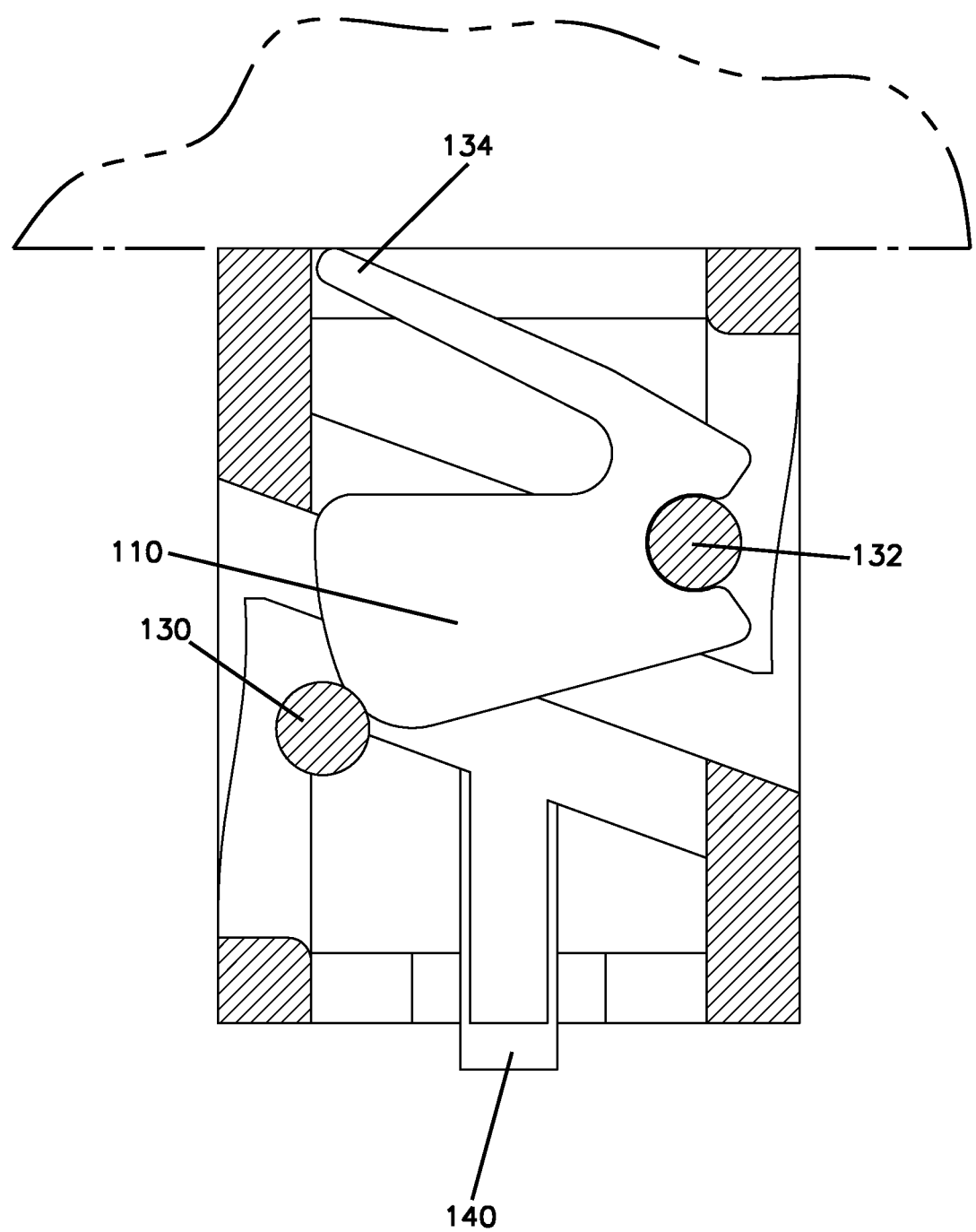
FIG. 41 is a cross-sectional, front view of a fiber optic cable retention device and a door in a closed position in accordance with the principles of the present disclosure.

The first end 105 and/or the second end 107 form the edges and/or surfaces at ends of the C-shaped body, as illustrated in FIGS. 26, 27, 28, 29, and 33. The first end 105 includes a space 150 and the second end 107 includes a second space 152. FIGS. 30, 31, 36, and 38 illustrate a cross-sectional view of a retention device 100 taken at line 30 from FIG. 29. FIGS. 39-41 further illustrate a cross-sectional view of the retention device 100. These cross-sectional views show a clear view of within the first space and the second space.

A post 130 extends from one end (105 or 107) within the space of the one end (105 or 107) as illustrated in FIGS. 29-31, 36, and 38-41. The post 130 may be any suitable size and shape for attaching a door 110 to one end (105 or 107) of the C-shaped body. A stopper 132 extends from one end (105 or 107) within the space as illustrated in FIGS. 30, 31, 36, and 38-41. The stopper 132 may be any suitable size and shape for abutting and/or stopping the rotation of the door 110. In some embodiments, the stopper 132 and/or post 130 are integral portions of one end (105 or 107) and/or the C-shaped body.

The first end 105 and the second end 107 of the C-shaped body form an opening 154 to the rounded interior 108 of the C-shaped body. The opening is sized and/or configured to allow at least one fiber optic cable to pass through the opening at a time. However, a door 110 attached to the C-shaped body is configured and/or sized so that the door 110 in a closed position at least substantially covers the opening. The opening is substantially closed off or covered if a single fiber optic cable could not pass through the opening provided between the ends (105 or 107) of the C-shaped body and the door 110. In the closed position, fiber optic cables cannot be added to or removed from the interior of the retention device 100. For instance, FIGS. 26, 29-31, 33, 36, and 39-41 illustrate a retention device 100 with a door 110 in a closed position. Further, the door 110 in the door closed position is at least partially located within the space within the one end (105 or 107) as illustrated in FIGS. 26, 29-31, 33, 36, and 38-41. In some embodiments, the door 110 in the door closed position is at least partially located within the spaces within each end (105 and 107) as illustrated in FIGS. 26, 30, 31, 33, 36, and 38-41.

Figure 26:
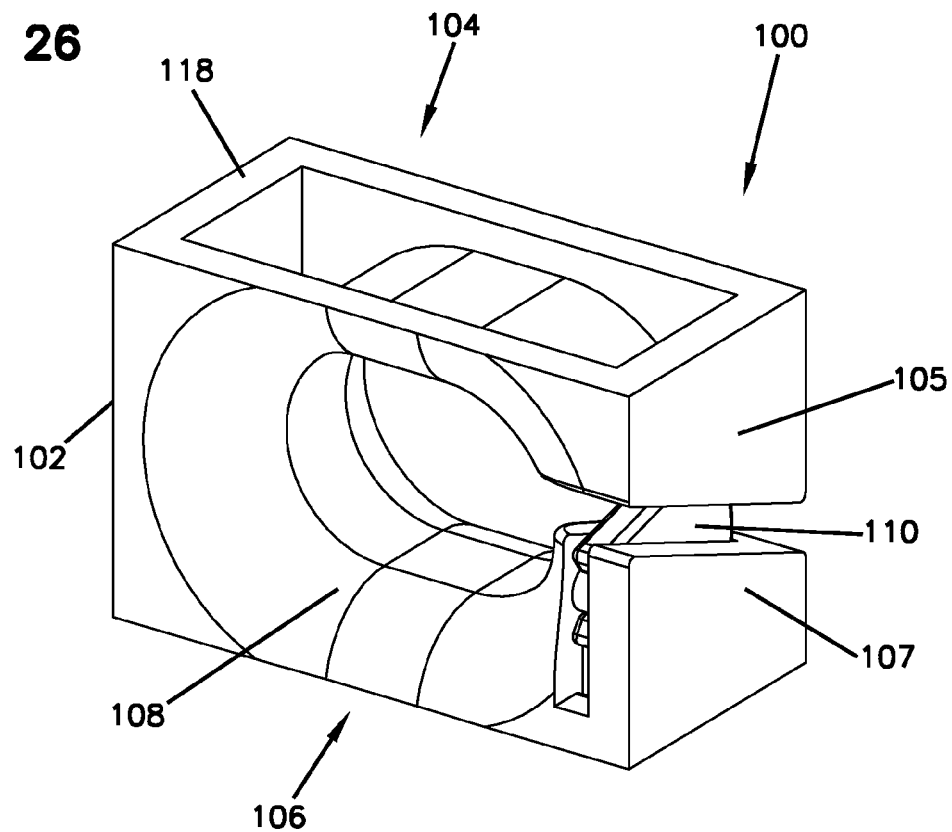
FIG. 26 is an isometric, first side view of an embodiment of a fiber optic cable retention device with a door in a closed position in accordance with the principles of the present disclosure.

The door 110 is moveable between an open position and a closed position. In some embodiments, the door 110 moves by moving around (such as rotating around) the post 130, which is fixedly attached to one end (105 or 107). In some embodiments, the door is inserted into the space within one end (105 or 107) and attached to post 130 through an aperture 160 located on the top or bottom side of the retention device 100. The apertures of the bottom and top sides are illustrated in FIGS. 34 and 26. As shown, ends 105, 107 have flat exteriors.

Figure 27:
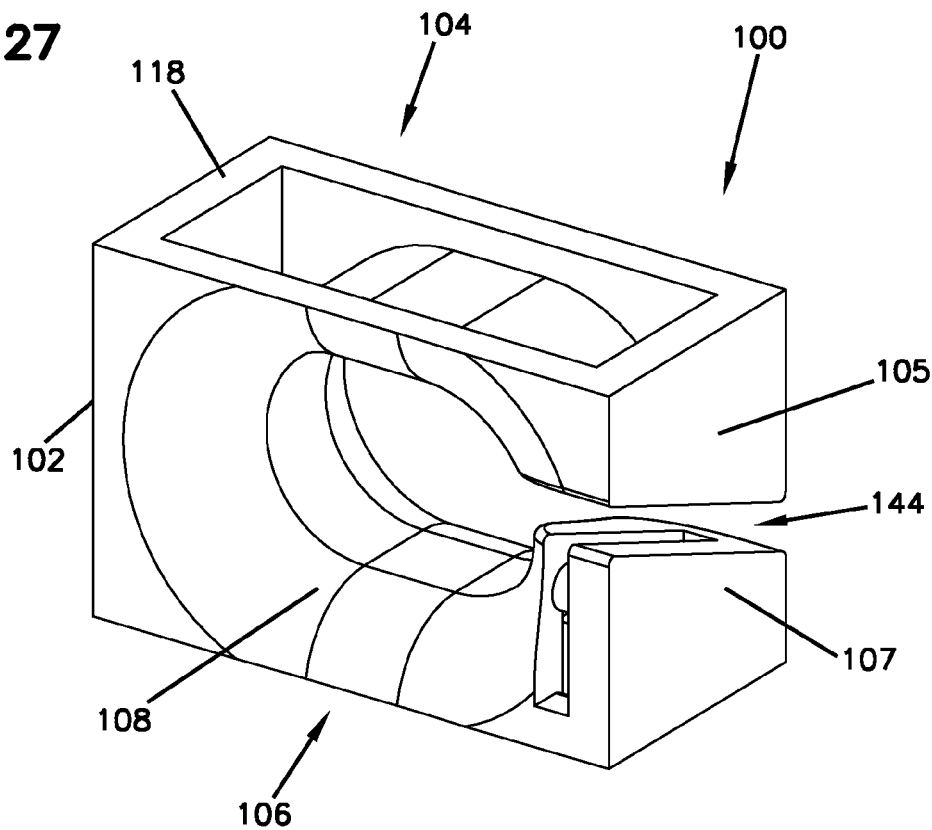
FIG. 27 is an isometric, first side view of an embodiment of a fiber optic cable retention device without the door in accordance with the principles of the present disclosure.
Figure 30:
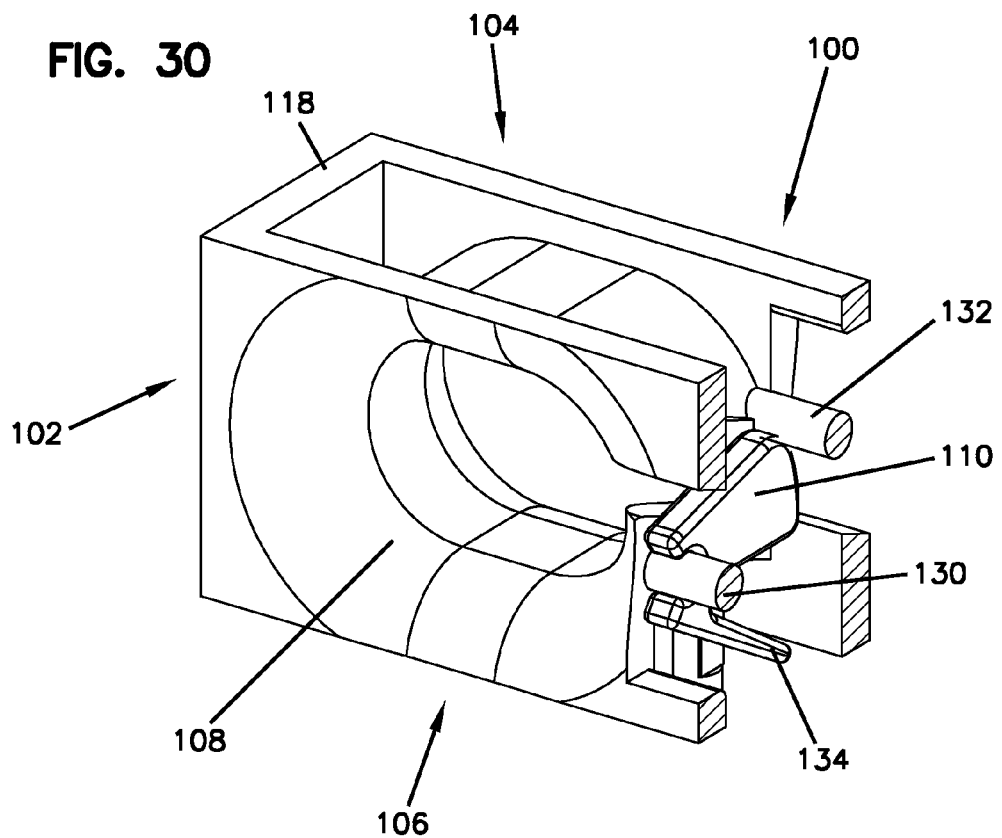
FIG. 30 is an isometric, cross-sectional, first side view of a fiber optic cable retention device in accordance with the principles of the present disclosure.
Figure 31:
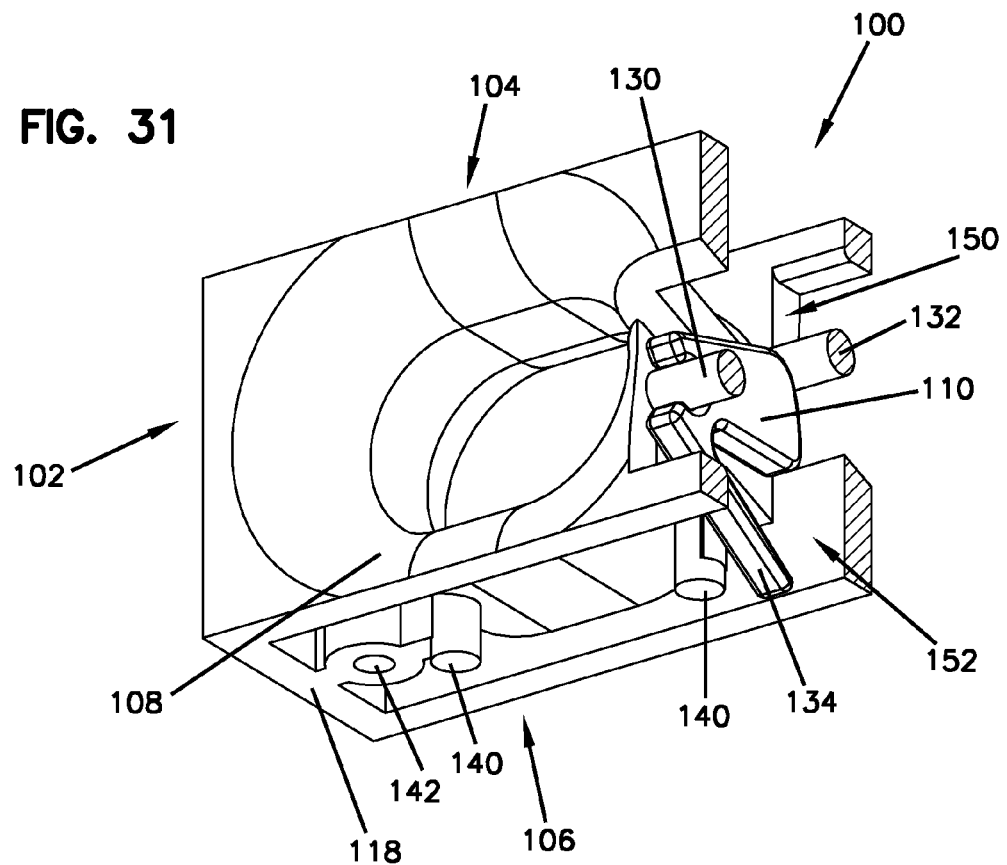
FIG. 31 is an isometric, cross-sectional view of an embodiment of a fiber optic cable retention device in accordance with the principles of the present disclosure.
Figure 36:
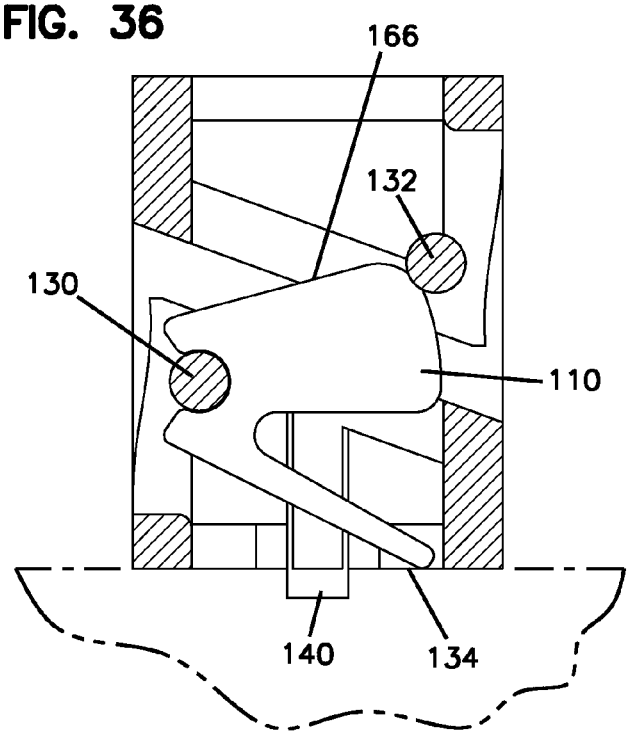
FIG. 36 is a cross-sectional, front view of a fiber optic cable retention device and a door in a closed position in accordance with the principles of the present disclosure.
Figure 37:
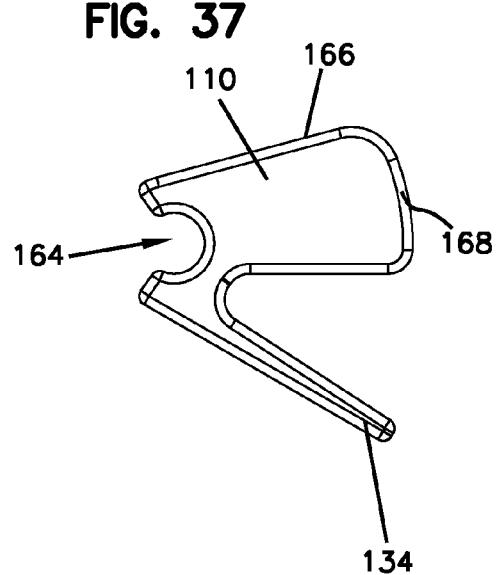
FIG. 37 is a first side view of a door of a fiber optic cable retention device in accordance with the principles of the present disclosure.

The door 110 is in an open position when a passageway between the door 110 and one end (105 or 107) of the C-shaped body is at least wide enough for a single fiber optic cable to pass through the opening between the door 110 and one end (105 or 107) of the C-shaped body. In some embodiments, the open position may allow for multiple fiber optic cables to pass through the opening at one time. In the open position, fiber optic cables may be added to or removed from the interior of the retention device 100. For instance, FIGS. 27 and 38 illustrate a retention device 100 with a door 110 in an open position.

The door 110 may be moveably attached to the C-shaped body by a number of various mechanisms. In some embodiments, the door 110 is moveably attached to the post 130 of one end (105 or 107) of the C-shaped body as illustrated in FIGS. 29-31, 36 and 38-41. In these embodiments, the door 110 includes a receiving area 164 for receiving a post 130 extending from the one end (105 or 107) of the C-shaped body as illustrated in FIGS. 36-38 and 41. In some embodiments, the receiving area of the door 110 snap-fits around the post 130. In some embodiments, the receiving area 164 of the door 110 is shaped and/or configured to allow the door 110 to rotate around the post 130 once attached to the post 130.

The door 110 is biased into the closed position with a biasing force. The biasing force may be created by an extension member 134. The door 110 includes an extension member 134 as shown in FIGS. 36-41. The extension member 134 is a portion of the door 110 that extends out from a receiving area on the door 110. The extension member 134 is a flexible piece that exerts a biasing force when abutted against a solid object such as one end (105 or 107) of the C-shaped body or a surface of a mounted object. The retention device 100 is mounted to or against a surface of an object, such as a panel, plate, or cabinet. In these embodiments, as the door 110 is opened the extension member 134 abuts against a mounted surface and/or one end of the C-shaped body. The extension member 134 flexes against the abutment biasing the door 110 towards the closed position. Accordingly, as soon as the force that is being applied to the door 110 to bias the door 110 into an open position ends, the flexibility of the extension member biases the door 110 back into the closed position.

When the door 110 is attached to the first end 105 of the C-shaped body, the biasing force biases the door 110 towards the second end 107 of the C-shaped body. When the door 110 is attached to the second end 107 of the C-shaped body, the biasing force biases the door 110 towards the first end 105 of the C-shaped body. The door 110 may be moved, pivoted, and/or rotated to the door open position by applying a force to the door 110 opposite to the biasing force. The force may be the manual application of force by an operator, installer, or user of the telecommunication infrastructures. For example, the door 110 may be opened via a force from at least one fiber optic cable 116 pushing up against surface 166 of the door 110. Once the cable 116 has reached the interior of the C-shaped body or passes over the door 110, the extension member 134 biases the door back into the closed position. Accordingly, the biased door 110 provides for a fast, easy, and/or efficient process for storing and/or managing cables in a telecommunication infrastructure. The cables are removed in the same manner, by applying a force to the door.

Further, as illustrated in FIGS. 26-28, 33, 36, 38, and 41 in some embodiments, the ends (105 and 107) are correspondingly angled. Therefore, in these embodiments, a fiber optic cable has to be manipulated or angled to slide through the opening between ends 105 and 107. Typically, fiber optic cables will not naturally angle. Accordingly, the correspondingly angled ends (105 and 107) help to prevent fiber optic cables retained within the retention device 100 from being able to pass out of the retention device 100 without some type of manual assistance. Further, in these embodiments, the angle of the ends (105 and 107) along with the configuration of the door only allow fiber optic cables to be added or removed by pushing on the door 110 in one direction. For example, in FIGS. 33, 36, and 38 a fiber optic cable can only be removed or added by applying a force (by the cable) on the door 110 on surface 166 in a direction from left to right. Alternatively, FIGS. 39-41 illustrate an embodiment of a retention device that only allows a cable to be added or removed by applying force on the door 110 in a direction from right to left. Therefore, the correspondingly angled ends 105 and 107 provide for better cable retention and security.

In some embodiments, the door 110 abuts against a portion of one end (105 or 107) of the C-shaped body in the open position. This portion may prevent the door 110 and/or the post 130 from moving any further in a direction opposite the biasing force. Further, the door 110 in the door open position may be entirely and/or partially contained within the space within the one end (105 or 107). Applying a force on surface 168 typically does not cause movement of the door 110 since it is not as angled as surface 166.

In some embodiments, the door 110 abuts against a stopper 132 extending from one end (105 or 107) within the space in the closed position. The stopper 132 prevents the door 110 and/or the post 130 from moving any further in the direction of the biasing force. Further, the door 110 in the door closed position is partially contained within the space within the one end (105 or 107) where the stopper 132 is located. In the embodiment of FIGS. 39-41, the functions of the post 130 and the stopper 132 are reversed.

As discussed above, all of the designs and/or configurations of the retention devices 100 disclosed herein allow for quick and easy insertion, storage, and removal of the fiber optic cables from the interior of the retention device 100. Accordingly, the retention devices 100 described herein are easily adaptable to properly accommodate for cable management arrangements and schemes in telecommunication infrastructures that are massive in scale, have limited space, and/or require subsequent adaptation of the infrastructures.

Numerous other changes may be made which will readily suggest themselves to those skilled in the art and which are encompassed in the spirit of the disclosure and/or as defined in the claims. While various embodiments have been described for purposes of this disclosure, various changes and modifications may be made which are well within the scope of the present disclosure.

The invention claimed is:

1. A fiber optic cable retention device comprising:
a C-shaped body including a base, a first side, a second side, a first end, a second end, and a rounded interior, the first end includes a first space in the C-shaped body, the second end includes a second space in the C-shaped body;
wherein an opening to the rounded interior of the C-shaped body is created between the first end and the second end of the C-shaped body, at least one of the first and the second sides includes a planar portion, the rounded interior extends from at least the base, the first side, and the second side;
a moveable door moveably attached to a post extending from the first end of the C-shaped body within the first space, the moveable door includes an extension member and the moveable door is sized to extend at least substantially from the first end of the C-shaped body to the second end of the C-shaped body to at least substantially cover the opening when in a closed position, a biasing force exerted by the extension member biases the moveable door into the closed position, the moveable door configured to move in a plane extending between the first end and the second end and closing the opening of the rounded interior of the C-shaped body,
wherein the rounded interior has a curvature larger than a minimum bend radius of any fiber optic cables stored within the fiber optic cable retention device, and
wherein the moveable door is configured to rotate further into the first space and into an open position when a force opposite the biasing force is applied to the movable door.

2. The fiber optic cable retention device of claim 1, wherein the C-shaped body includes at least one of a third side and a fourth side.

3. The fiber optic cable retention device of claim 2, wherein at least one of the third side and the fourth side includes a planar portion.

4. The fiber optic cable retention device of claim 1, wherein the biasing force is created by the extension member abutting a portion of a mounted surface.

5. The fiber optic cable retention device of claim 1, wherein the base defines a planar surface portion.

6. The fiber optic cable retention device of claim 5, wherein all of the base, the first side, and the second side include planar surface portions.

7. The fiber optic cable retention device of claim 1, further comprising a stopper extending from the second end of the C-shaped body within the second space, wherein the moveable door abuts the stopper within the second space when in the closed position.

8. The fiber optic cable retention device of claim 1, wherein the first end and the second end are correspondingly angled.

9. A fiber optic cable retention device comprising:
a C-shaped body including a base, a first side, a second side, a first end, a second end, and a rounded interior, the first end includes a first space in the C-shaped body, the second end includes a second space in the C-shaped body;
wherein an opening to the rounded interior of the C-shaped body is created between the first end and the second end of the C-shaped body, the first and the second sides include a planar portion, the rounded interior extends from at least the base, the first side, and the second side;
a door including an extension member is attached to a post extending from the second end of the C-shaped body within the second space, the door is sized to extend at least substantially from the second end of the C-shaped body to the first end of the C-shaped body to at least substantially cover the opening when in a closed position, a biasing force from the extension member biases the door into the closed position;
wherein the door moves in plane which intersects the base and both the first side and the second side;
wherein the rounded interior has a curvature larger than a minimum bend radius of any fiber optic cables stored within the fiber optic cable retention device; and
wherein the door is configured to rotate further into the second space and into an open position when a force opposite the biasing force is applied to the door.

10. The fiber optic cable retention device of claim 9, wherein the C-shaped body includes a planar portion in the base, and further includes at least one of a third side and a fourth side that define the opening.

11. The fiber optic cable retention device of claim 10, wherein at least one of the third side and the fourth side include a planar portion.

12. The fiber optic cable retention device of claim 9, wherein the post is a first post, and wherein a second post is provided, wherein the door can be mounted to either post.

13. The fiber optic cable retention device of claim 9, wherein the biasing force is created by the extension member abutting a portion of a mounted surface.

14. The fiber optic cable retention device of claim 9, further comprising a stopper extending from the first end of the C-shaped body within the first space, wherein the door abuts the stopper within the first space when in the closed position.

15. The fiber optic cable retention device of claim 9, wherein the first end and the second end are correspondingly angled.

* * * * *